Sept. 28, 1965  J. K. HOLY  3,209,222
DISCRETE SIGNAL ELECTRICAL POSITIONING CONTROL SYSTEM
Filed Sept. 24, 1962  16 Sheets-Sheet 1

INVENTOR.
JOSEF K. HOLY,
BY E. F. Oberhein
AGENT

Sept. 28, 1965   J. K. HOLY   3,209,222
DISCRETE SIGNAL ELECTRICAL POSITIONING CONTROL SYSTEM
Filed Sept. 24, 1962   16 Sheets-Sheet 5

Sept. 28, 1965  J. K. HOLY  3,209,222
DISCRETE SIGNAL ELECTRICAL POSITIONING CONTROL SYSTEM
Filed Sept. 24, 1962  16 Sheets-Sheet 8

Sept. 28, 1965 J. K. HOLY 3,209,222
DISCRETE SIGNAL ELECTRICAL POSITIONING CONTROL SYSTEM
Filed Sept. 24, 1962 16 Sheets-Sheet 12

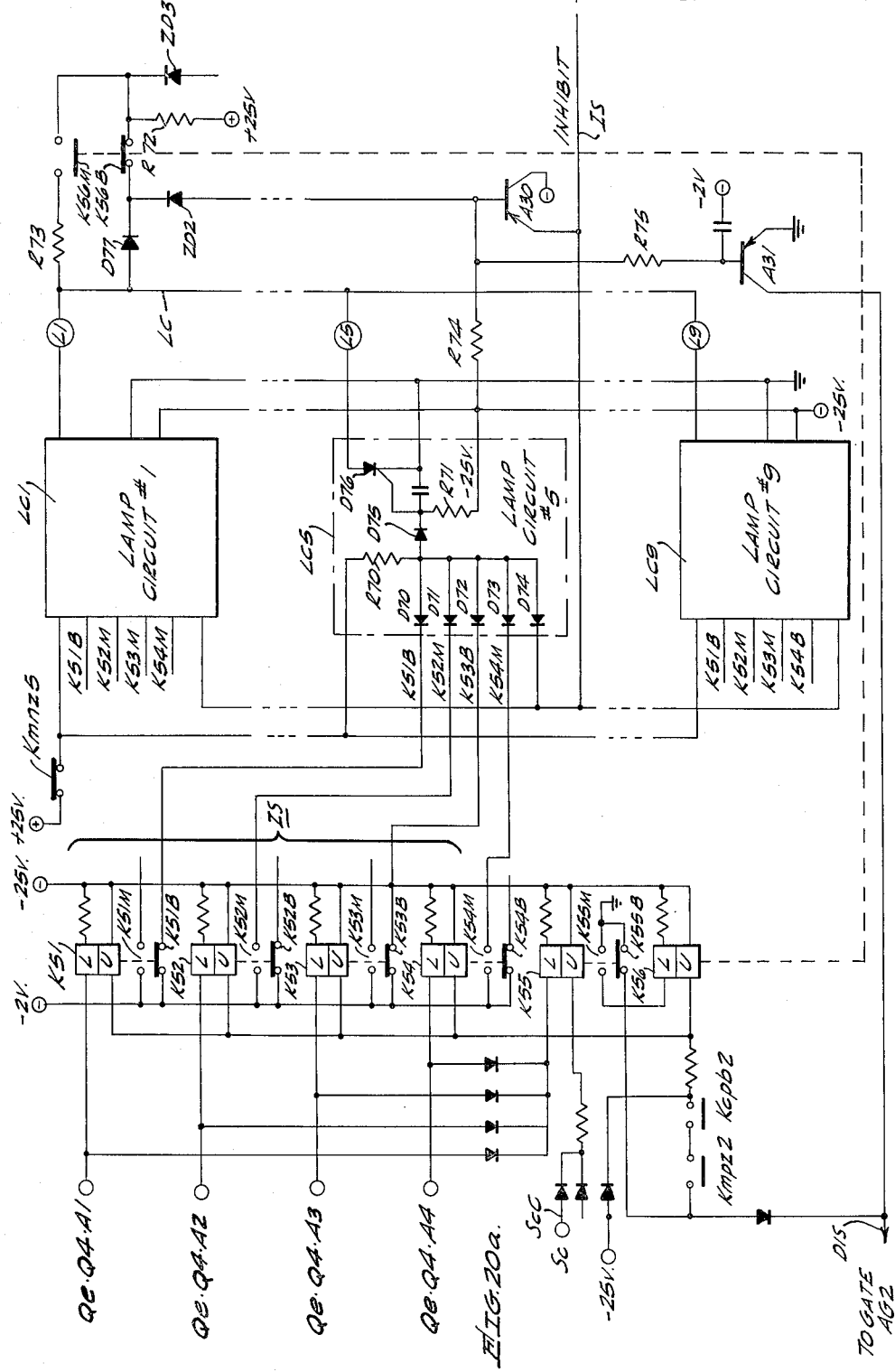

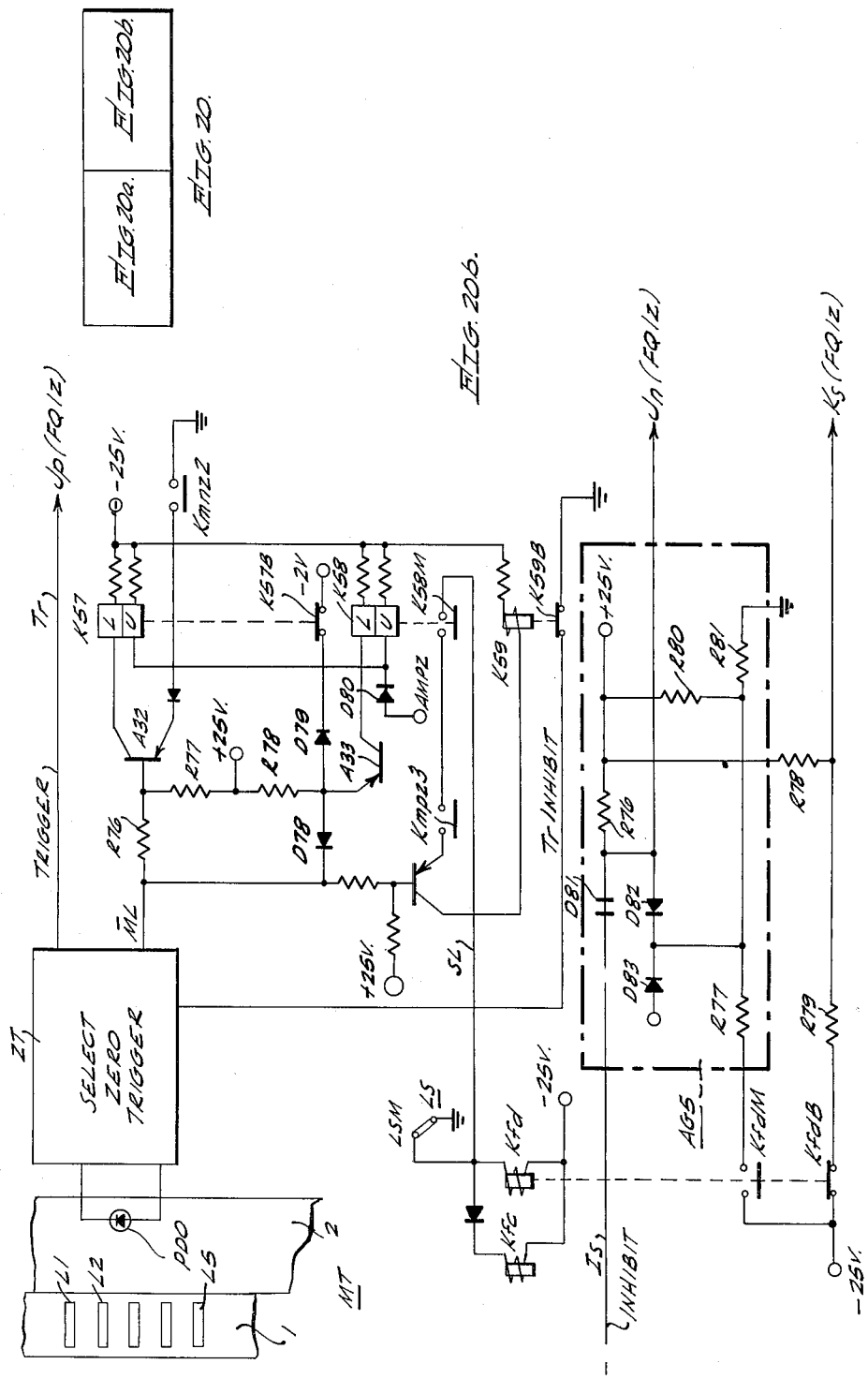

United States Patent Office 3,209,222
Patented Sept. 28, 1965

3,209,222
DISCRETE SIGNAL ELECTRICAL POSITIONING CONTROL SYSTEM
Josef K. Holy, Torrance, Calif., assignor to Hughes Aircraft Company, Culver City, Calif., a corporation of Delaware
Filed Sept. 24, 1962, Ser. No. 225,725
10 Claims. (Cl. 318—28)

This invention relates generally to electrical control systems and more particularly to numerically programmed systems for controlling power operated devices.

In this connection illustrative reference is made to positioning systems such as found in machine tool controls, for instance, wherein movable platens or tables, spindles, etc., are positioned in one or several axes in accordance with programs defined in some suitable type of numerical code.

With reference to positioning systems such as found in conventional machine tools, having three orthogonally related axes of freedom for workpiece and tool positioning movements, it has been found that where fixed zero position references are involved and when repetitive positioning movements are required in any one or more of the several axes of freedom, excesses of positioning movement may result. In the case of a turret drill, for instance, the machine spindle assembly is usually moved between a fixed zero or retracted position to a position in which the selected tool is disposed adjacent a surface of a workpiece, at which point further movement usually takes place at some prescribed feed rate for performing the selected machine operation. If holes are to be drilled in a flat plate, for instance, in selected places, the machine table may be positioned in one or both of its horizontal degrees of freedom to locate a spot on the plate beneath the drill. At this point the drill is moved from its retracted position at some selected traverse speed and adjacent the surface of the workpiece is switched to feed rate and the drilling operation performed. If another hole is to be drilled the tool is usually retracted to its fully retracted position, the machine table repositioned, and thereafter the drill spindle assembly is moved from retracted position to perform the second drilling operation at the newly selected point.

The movement of the tool spindle assembly from tool clearance position to retracted position may represent, in this situation, a substantial portion of the total freedom of movement of the spindle axis, and where multiple drilling operations of this character are to be performed, the bulk of the time involved in the entire machining operation is represented in time spent moving the spindle assembly between retracted and tool clearance positions with respect to the workpiece.

Efforts to minimize this problem have resulted in the provision of counters in machine tool controls in which a specified zero is programmed. However, such controls, if overshoot in retracting for instance takes place, permit counting from other than the indicated zero and positioning errors frequently occur even though the rate of axis movement is reduced as the selected zero position is approached.

Accordingly, one object of this invention is to provide an improved numerically controlled electrical system for selectively positioning a movable member in accordance with a predetermined discrete signal program.

Another object of this invention is to provide an improved electrical system of control which minimizes movements of a member being positioned when repetitive positioning operations are programmed.

A further object of this invention is to provide an improved positioning control system having a variable zero reference in at least one axis of freedom.

More particularly, it is an object of this invention to provide an improved positioning control system in which a selected one of a plurality of zero reference points may be programmed in a particular axis of freedom.

It is also an object of this invention to provide a control of the character referred to in the preceding object in which programming is simplified.

Further separate and combined objects of this invention are to provide a selective zero positioning control which requires a minimum of equipment, which permits high operating speeds in and about the selected zero point, and which substantially obviates counting errors about the zero point.

The aforesaid and other objects and advantages may be accomplished in a numerically programmed type of machine type control according to a presently preferred embodiment of this invention, in the provision of a selective zero control for at least one axis of freedom. While such an arrangement may be applied in any axis of freedom of a machine such as machine tool, or, other machine having a movable element to be positioned, particular advantages are found in the application of the selective zero control in moving and positioning a cutting tool along its feed axis.

For the purposes of this discussion a numerically programmed type of machine tool control is assumed. Such a machine tool control includes suitable information input equipment defining a program of operation for the tool. The information input equipment may be any standard type of discrete signal equipment such as a tape reader, for instance, which presents a discrete signal program, which may be in binary coded decimal form, in a serial-parallel type of information system. The output of such a tape reader is usually applied to a suitable type of electrical control which includes a distributor for distributing serially presented groups of discrete signals to different storage points in the system for the purpose of controlling the machine tool. Such storage points may include position counters or counting registers which store discrete signals defining desired positions of the several movable machine tool members in their respective axes of freedom.

The system also includes suitable incremental position transducers operated by the movable members in the several axes of freedom for the purpose of producing signals representing increments of displacement as the members are moved in their respective axis to thereby provide a count of actual positioning movement which is compared in any suitable manner with the contents of the position counters, which latter indicate desired positions in the respective axes.

The incremental position transducers, whether of the rotary type or the linear type, usually have a fixed zero or reference position representing the point in a particular axis at which the count of increments of positioning movement takes place. Where a position counter or counting register is employed to indicate a desired position of a member in its axis of freedom, the signals generated with each increment of displacement by the incremental position transducers as positioning movement takes place, may be applied to the position counter or counting register in such sense as to provide count down operation. At the time the position counter is counted down to zero or some other predetermined minimum count which is a particular system represents the desired position, the movable member is stopped and positioning is completed.

To obviate the need for counting from the fixed zero reference of the incremental positions transducers with each positioning movement, provision is made herein in the distribution of suitable instrumentalities along a particular axis of freedom, for selectively establishing a zero point from which scale counting takes place, and, which, as part of the selective zero function, provides suitable controls in the system to inhibit counting of the discrete signals of the incremental transducer until such time as the zero point which has been selected in sensed. Thereafter, counting may take place in the manner described hereinabove, or, in some other suitable manner, under the control of the discrete signals generated by the incremental position transducers.

With this arrangement, the positioning program which is written on the tape, or, other discrete signal program carrier, defines a desired position with respect to a particular scale zero point which has been selected and the system provides controls whereby scale counting will take place only from that selected zero point after sensing of the selected zero point has taken place. Once the positioning operation has been performed and the movable member is being retracted, the selected zero point defines the limit of retraction of the movable member from which another positioning movement in the associated axis of freedom may take place.

The aforesaid and other objects and advantages, together with other embodiments of this invention, will become apparent from a study of the following specification when considered in conjunction with the accompanying drawings in which:

FIG. 1 graphically denotes certain positioning movements in the feed axis of a machine tool system in relation to a schematically represented feed axis;

FIG. 2 illustrates a typical tape format usable in practicing this invention;

FIG. 3 graphically depicts idealized pulses in respective pulse trains denoting increments of positioning movement in both positioning and retracting directions, that is, positive or negative directions;

Figure 4:
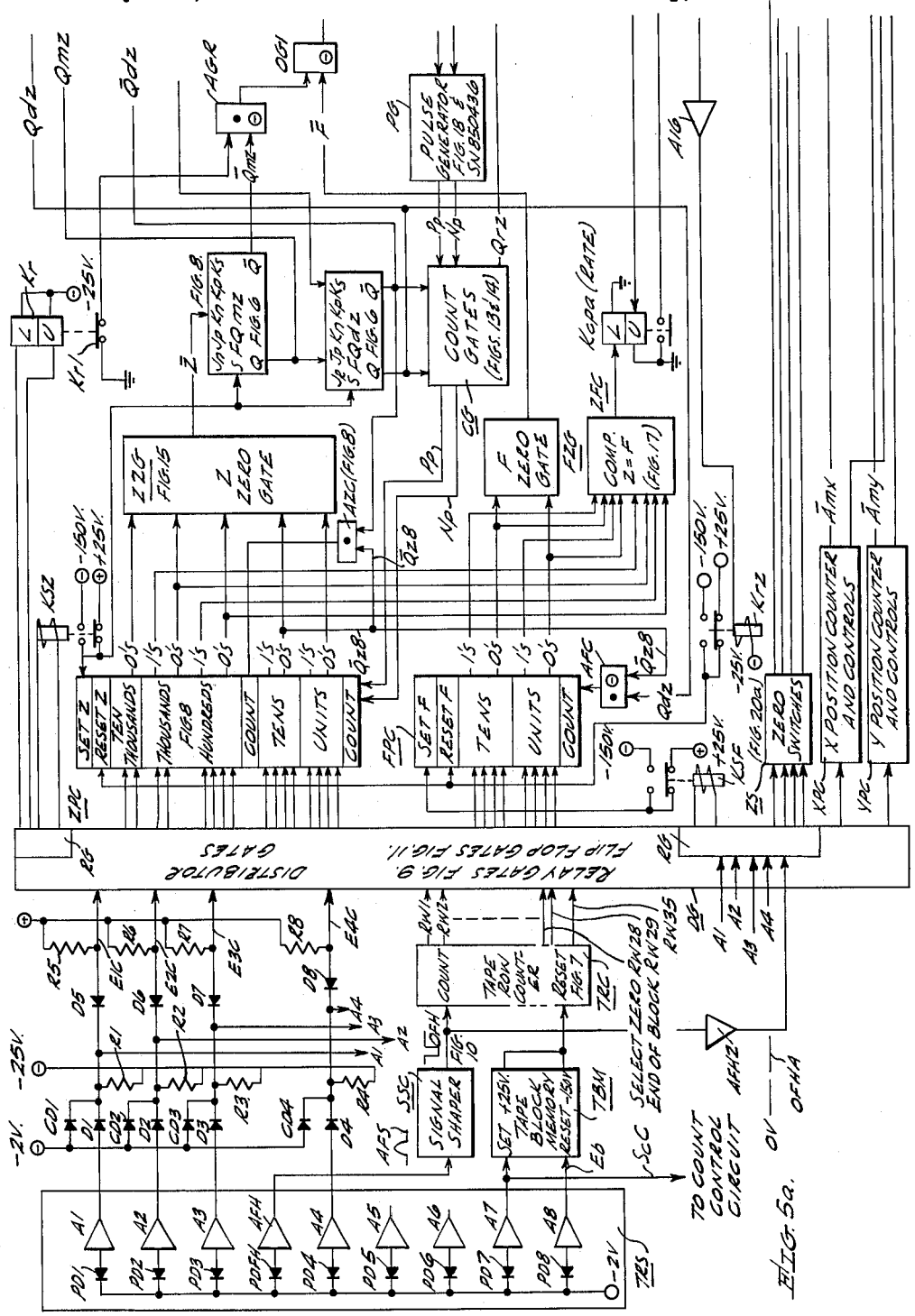
FIG. 4 is a block diagram of an improved electrical control system affording selective zero positioning operation and embodying the principles of this invention.
Figure 6:
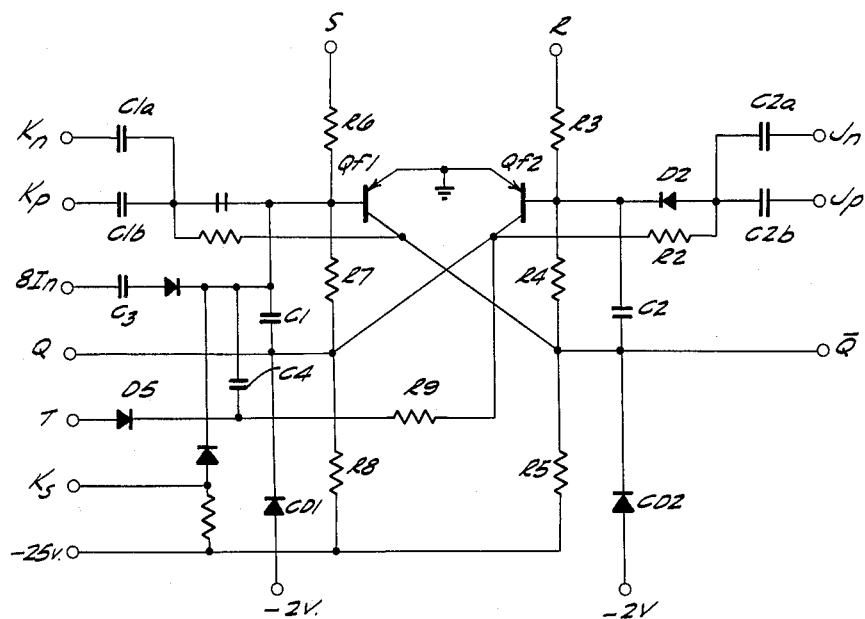
Figure 7:
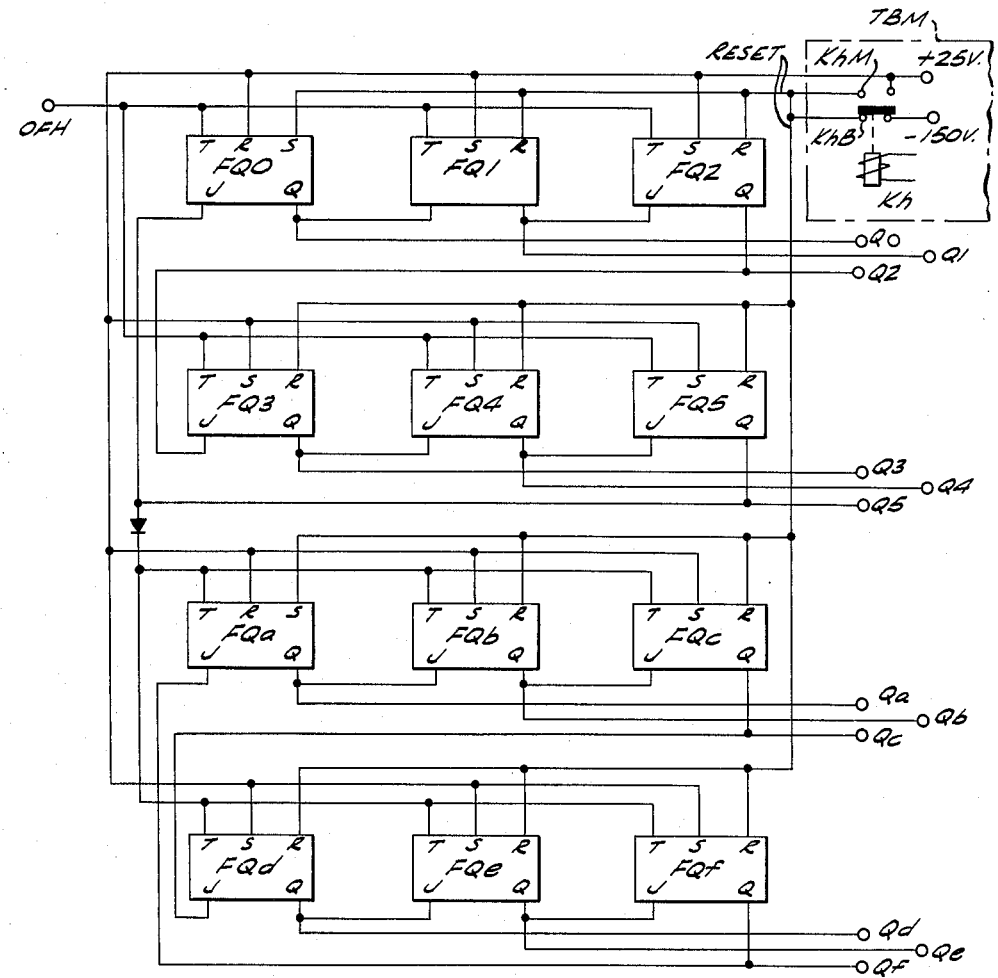
Figure 8:
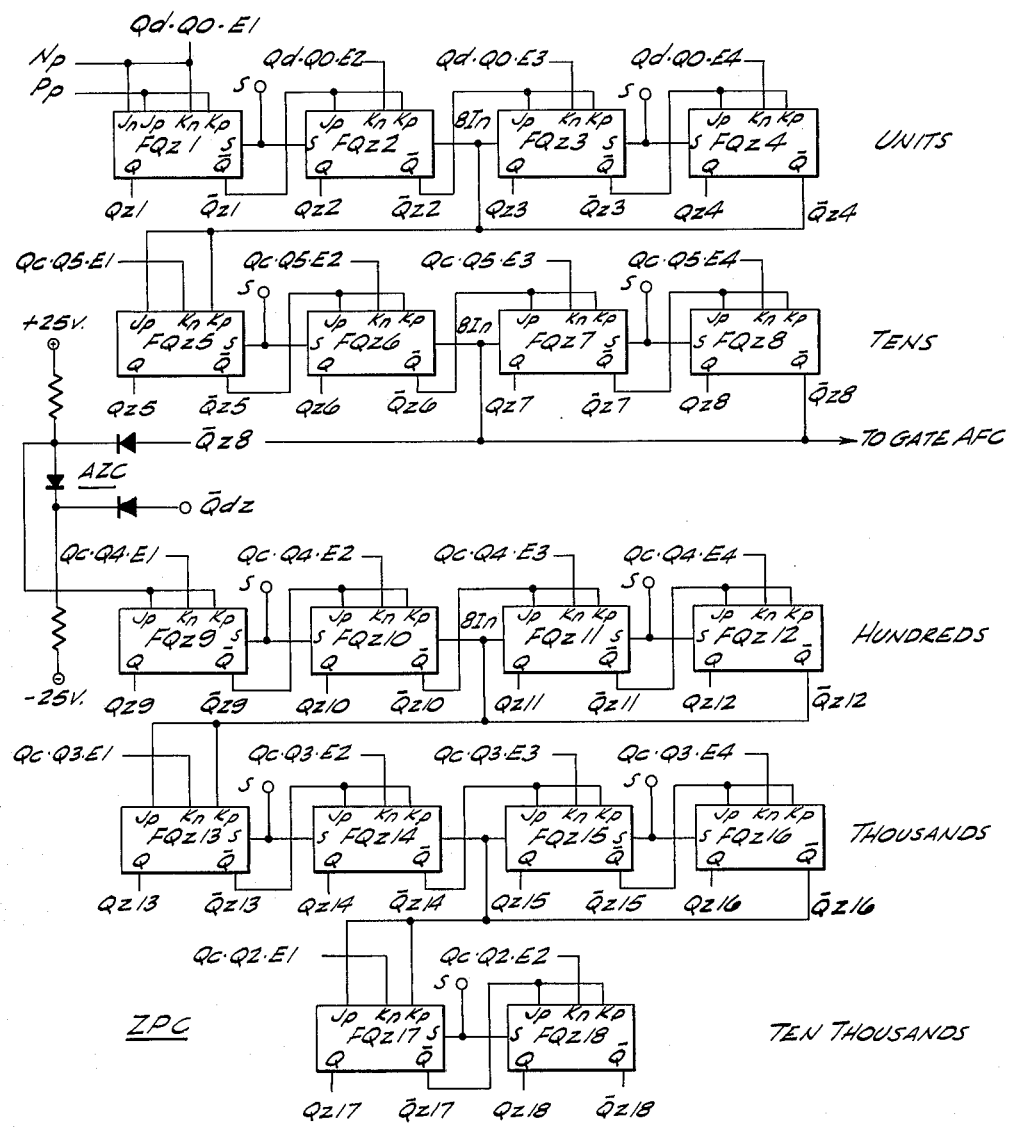
Figure 9:
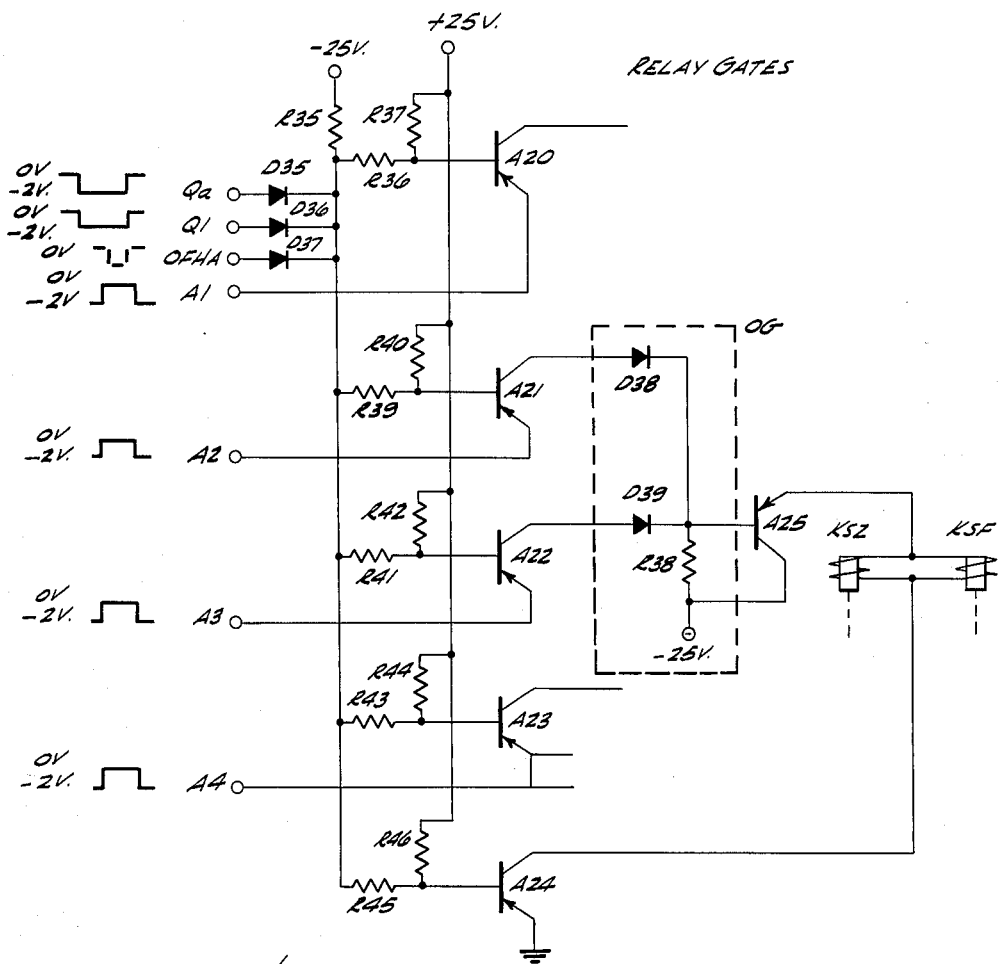
Figure 10:
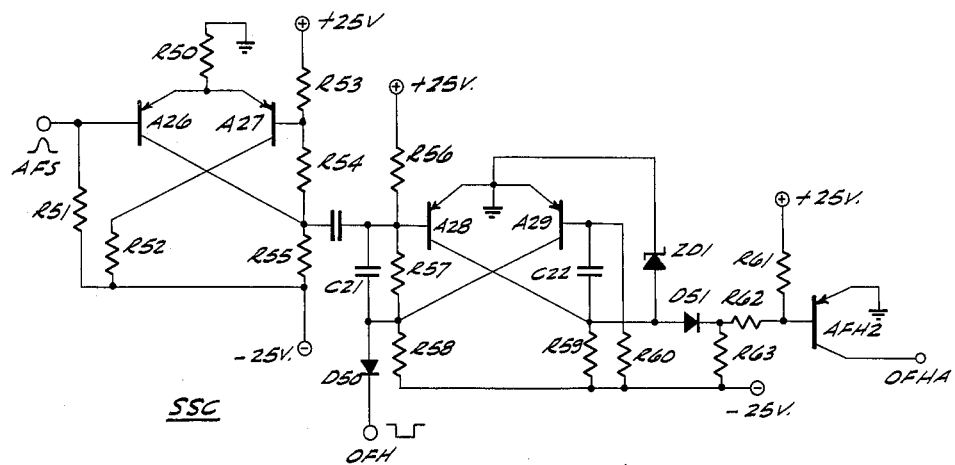
Figure 11:
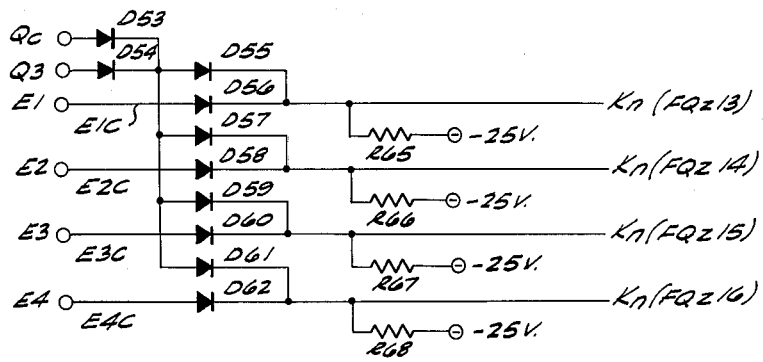
Figure 12:
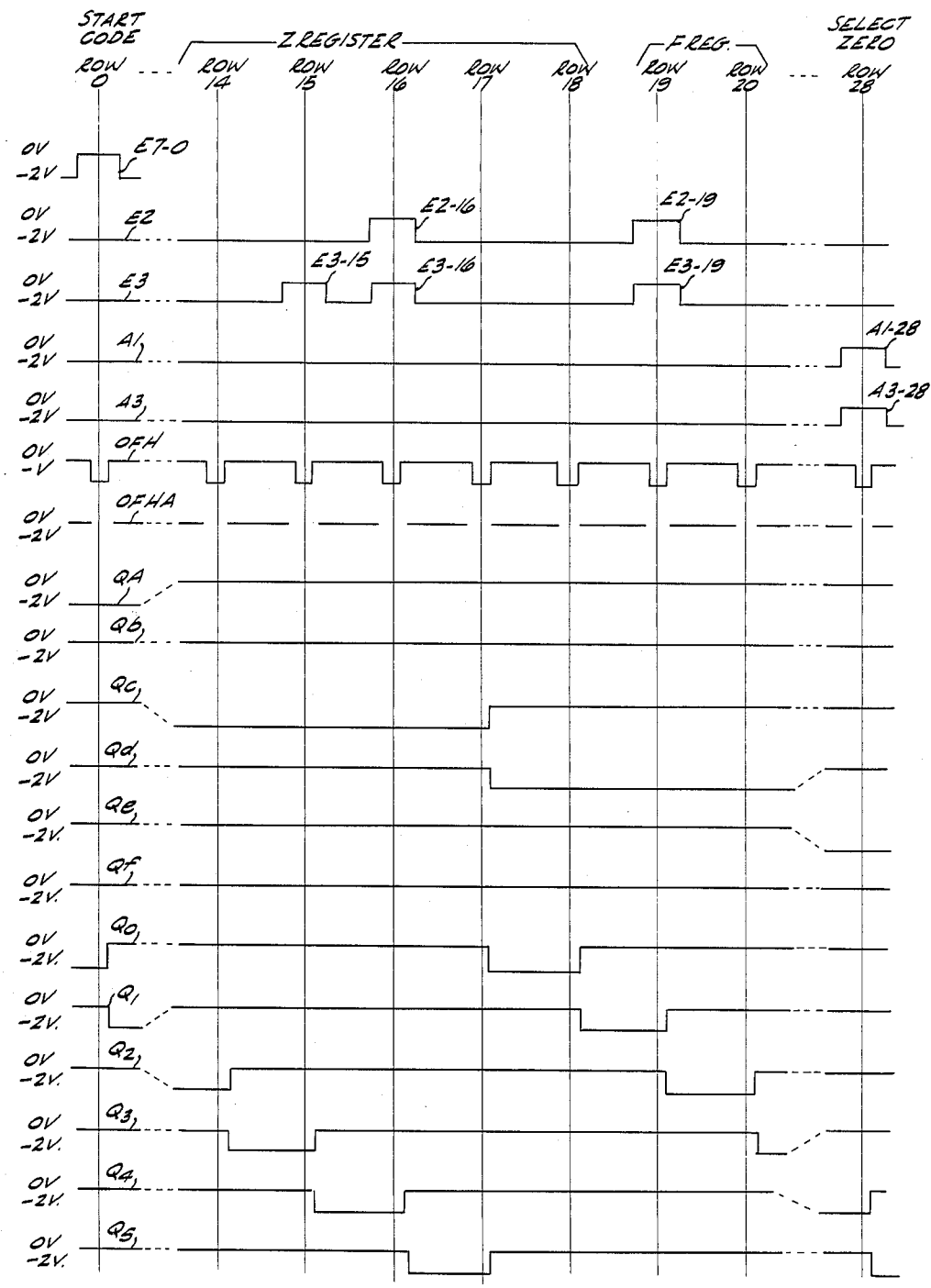
Figures 13, 14:
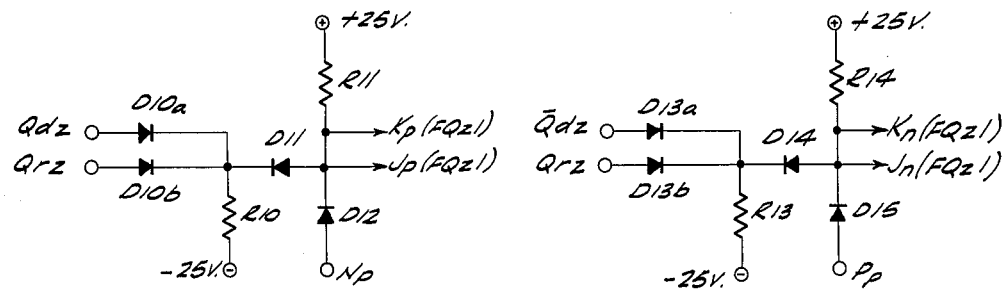
Figure 15:
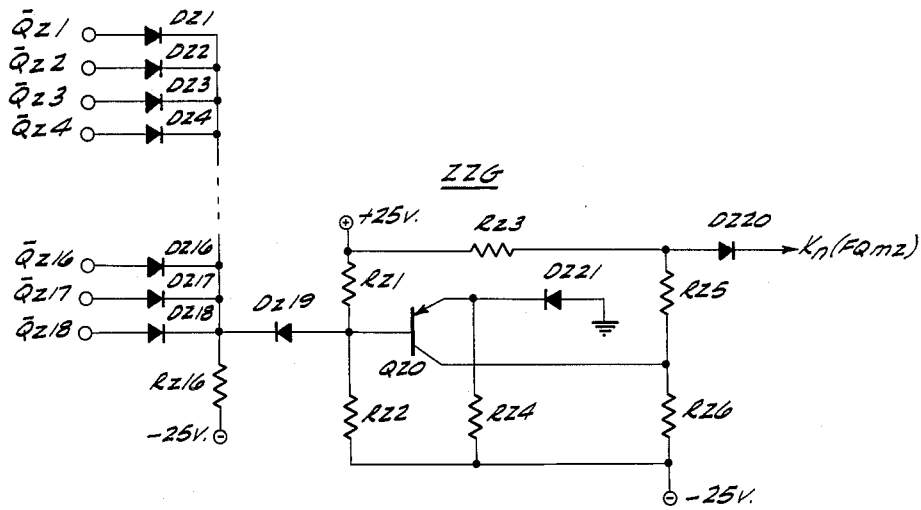
Figure 16:
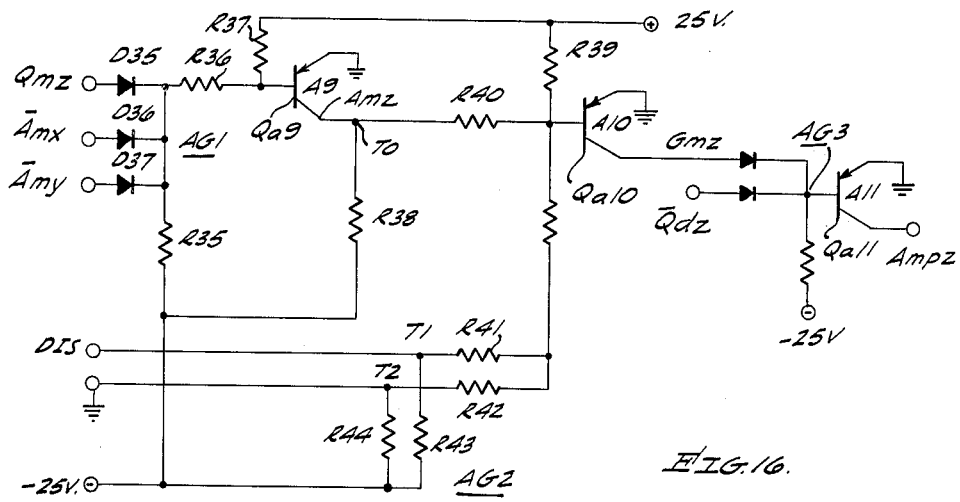
Figure 17:
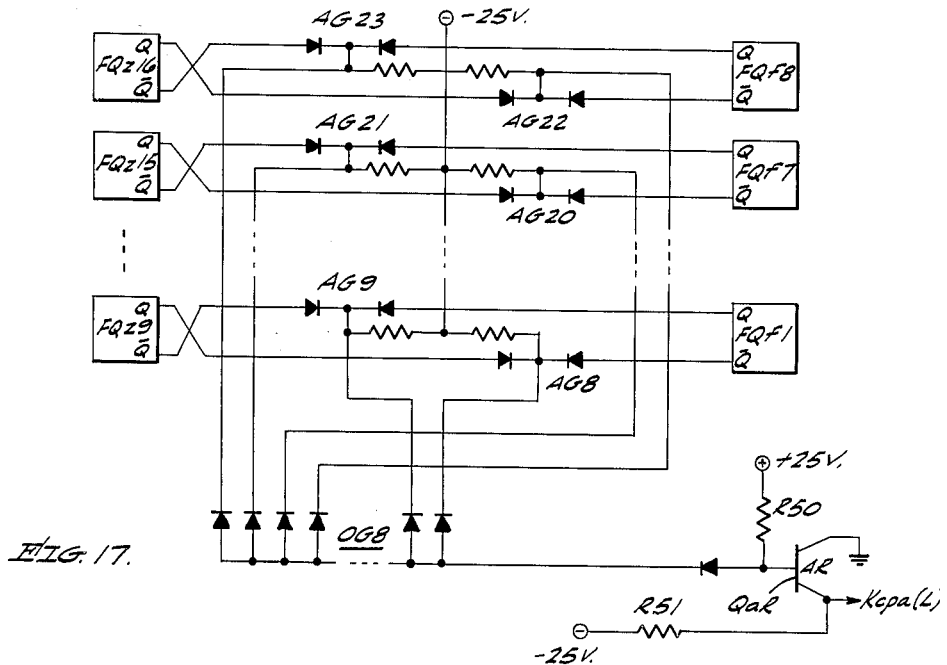
Figure 18:
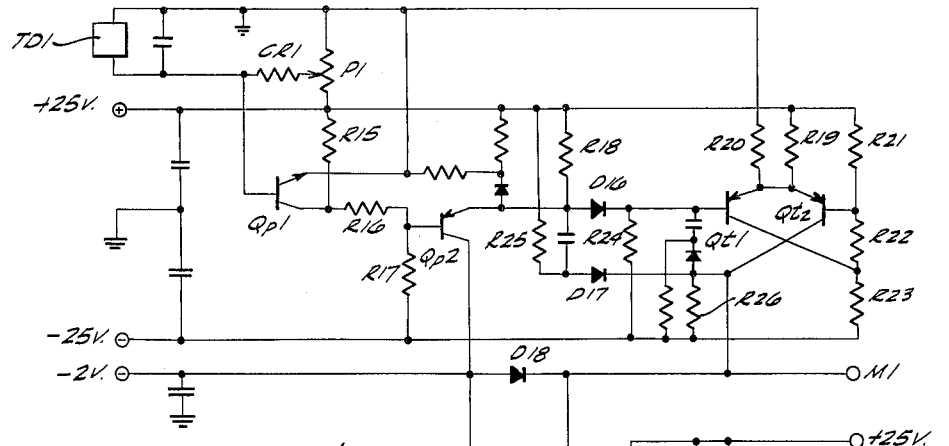
Figure 19A:
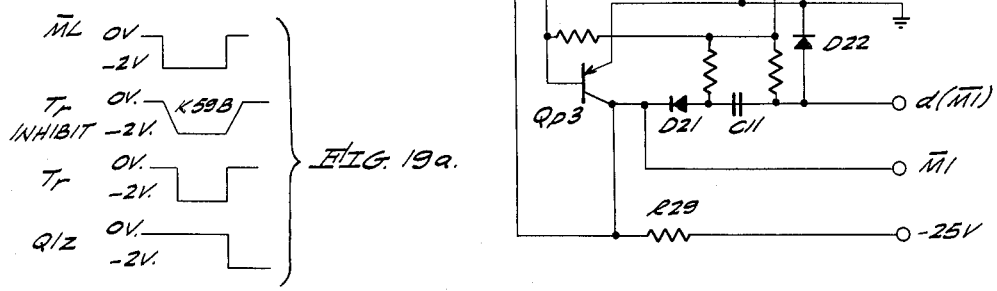
Figure 19:
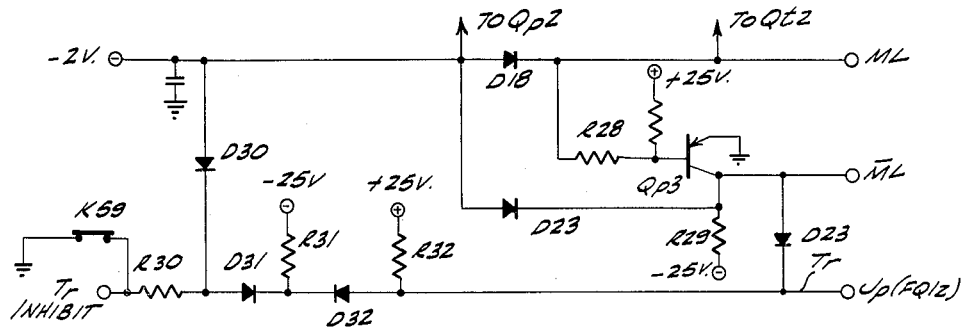

FIGS. 5a and 5b together, in greater detail than FIG. 4, illustrate a positioning system affording selective zero positioning operation in accordance with the principles of this invention;

FIG. 6 is a circuit diagram of a typical flip flop employed in this invention;

FIG. 7 is a block diagram of a counter forming part of an electrical distributor employed herein;

FIG. 8 is a block diagram of a counter register used as a position counter in controlling positioning movement in a particular axis;

FIG. 9 illustrates certain details of a typical relay gate employed in this invention;

FIG. 10 illustrates the circuit details of a signal shaper circuit incorporated herein;

FIG. 11 illustrates the details of a typical flip flop gate;

FIG. 12 is a signal timing diagram;

FIGS. 13 and 14 together form a count gate assembly used in controlling count-down operation of the position counter of FIG. 8;

FIG. 15 illustrates a circuit used to indicate when the contents of the counter of FIG. 8 are zero;

FIG. 16 illustrates the details of an amplifier arrangement for controlling movement of the movable member;

FIG. 17 diagrammatically illustrates a type of discrete signal comparator employed herein;

FIG. 18 illustrates certain details of an electrical circuit used in developing discrete signals or pulses under the control of the incremental position transducer and which are applied to count down the position counter of FIG. 8;

FIG. 19 is a fragmentary modification of the circuit of FIG. 18 illustrating a zero trigger circuit forming part of the selective zero control;

FIG. 19a is a timing diagram of signals associated with the circuit of FIG. 19;

FIG. 20 illustrates the physical relationship of FIGS. 20a and 20b; and

FIGS. 20a and 20b illustrate certain circuit details of a selective zero circuit embodying the principles of this invention.

Referring to FIGS. 1, 2, 3 and 4, the arrangement illustrated therein is primarily directed to the control of a machine tool MT (FIG. 1) wherein provision is made for selecting any one of several specifically identified positions along the feed axis of a machine spindle assembly as the zero reference for positioning operations in that axis. Such a machine tool assembly may typically include a machine base 1, which is stationarily mounted, and a movable spindle assembly 2 which, as illustrated in FIG. 1, may move up and down with respect to the machine base.

For the purpose of determining the actual position of the movable spindle assembly along its axis of freedom, an incremental position transducer is provided which comprises a scale S having a plurality of grooves therein on equally spaced centers. In one typical embodiment of this invention such a scale includes grooves which are on four mil centers. The scale is of magnetic material. The scale is resolved by means of a pair of magnetic heads, here denoted $HMz1$ and $HMz2$, which are disposed in side by side relationship and each of which includes a resolving pole face which is capable of resolving the lands and grooves of the scale S. The resolving pole faces of the magnetic heads are displaced relative to one another in a direction axially of the scale in the amount of about one-fourth of a scale division, a scale division being defined as the distance between corresponding adjacent points along the scale. In this illustration, the magnetic heads are connected to the machine spindle assembly tool and move therewith, the assembly being such that the magnetic heads sweep the length of the scale from start to finish for full movement of the spindle assembly along its axis of freedom. Alternatively the scale may be on the spindle and the heads on the base.

The details of such an incremental transducer system may be found in Patent No. 2,848,698, of T. T. Kumagai et al., issued August 19, 1958, and assigned to the assignee of this invention. As the magnetic heads sweep the lands and grooves the reluctances of the magnetic circuits change. As described in the patent aforesaid, the output voltages of these magnetic heads, which may be ideally depicted as square waves displaced in phase relation by 90 electrical degrees, are used to produce scale counts on a 4 mil scale division, indicative of 1 mil increments of displacement.

Figure 3:
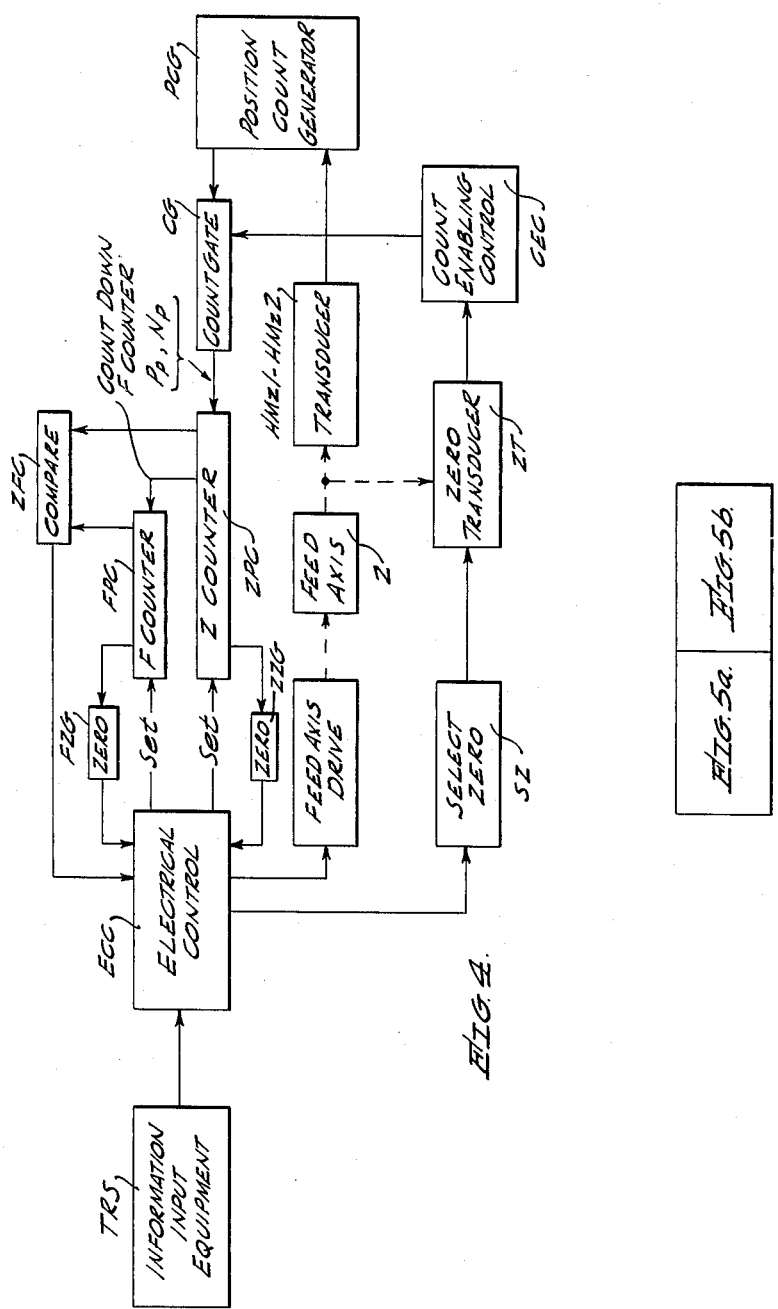

In accordance with the teachings of a copending application of M. R. McElroy, Serial No. 850,435, filed November 2, 1959, entitled Condition Responsive Electrical System, now abandoned, and assigned to the assignee of this invention, the electrical output signals of the magnetic heads are inverted. Both the signal and inverted signal are differentiated and the differentiated signals selectively combined with the signals and inverted signals, in a selected one of the two stable states of the signal and inverted signal, to provide an indication of increments of displacement and the direction in which displacement is taking place, in the production of respective pulse trains, $P_p$ or $N_p$, for either direction of movement. Typical pulse trains, $P_p$ and $N_p$, representing positive (down) and negative (up) directions of movement of the machine spindle assembly, respectively, are shown in FIG. 3 herein.

For the purpose of selecting points other than the zero position of the scale S as the zero reference from which positioning movement will take place, the machine spindle assembly is provided with a plurality of lamps, represented only as blocks, which are in axially spaced positions along the machine support, adjacent the spindle, and identified L1 through L9, providing 9 different zero reference points.

In one practical embodiment of this invention the lamps are positioned on one inch centers along the spindle path of movement substantially spanning the range of displacement of the spindle. Spacing the lamps on one inch centers provides a convenient distribution of zero points so that zero points in proximity to tool clearance points for varied workpiece configurations are available. At the same time the number of points is small enough that programming is minimal and system complexity is minimal.

In operation, provision is made for programming a selected one of lamps L1 through L9 on the tape, whence, as the tape is read, that particular lamp is selected and illuminated. These lamps are positioned so that their beams sweep a photodiode or other suitable type of photosensitive electrical device which is mounted on the machine spindle, so that the zero position is established whenever the photodiode intercepts a lamp beam. As will be described, the ensuing response of the photodiode to this illumination with light is effective to initiate counting operation for positioning of the machine spindle assembly in its axis of freedom. An alternative arrangement in which the lamps are on the machine spindle and the photodiode on the base may also be employed.

The fully retracted position of the machine tool is indicated by means of a limit switch, here illustrated as being mounted on the machine spindle assembly. The limit switch is designated LS and is provided with an actuating arm which projects outwardly therefrom and engages the surface of a cam LSC which is mounted on the machine base 1. As the machine spindle assembly moves downwardly the limit switch actuating member is released from the cam and the limit switch occupies its out-of-limit position. In the position indicated the limit switch is in its in-limit position.

As indicated in the left of FIG. 1, the extreme upper limit of movement of the machine spindle assembly is identified as the retracted position. Beneath this retracted position is another line indicating the position at which the limit switch is released to indicate that the machine has moved out of its fully retracted position. The fixed scale zero mark is indicated adjacent the first groove on the scale S. In the system herein to be described, two position counters or counting registers associated with the positioning of the machine spindle, are used. One of these is referred to as the Z position counter ZPC and defines the total distance that the machine spindle assembly is to move, either from scale zero, or, from some selected zero position, to the final machining position. The other position counter or counting register is referred to as the F position counter FPC and is set to define the distance over which the machine spindle is to move at feed rate.

The machine spindle assembly is initially operated at rapid traverse speed as it moves out of retracted position past the scale zero position and towards the position defined by the F counter, at which latter position the machine spindle is to be switched to feed rate. The position at which this change-over takes place is the position in which the remaining count in the Z counter is equal to the count which has been set in to the F counter. This is accomplished by suitable comparator circuits. Thereafter, the machine spindle moves at feed rate until the Z counter is counted to zero. An anticipation point may be provided which may be some predetermined fixed count, say .039 thousandth, that is, 39 counts from zero, at which the system may be switched to creep mode. FIG. 1 also illustrates the respective positions in which the Z count may be started under the control of the selective zero operation hereof and covers a positioning example to be described hereinafter.

TAPE FORMAT

Figure 2:
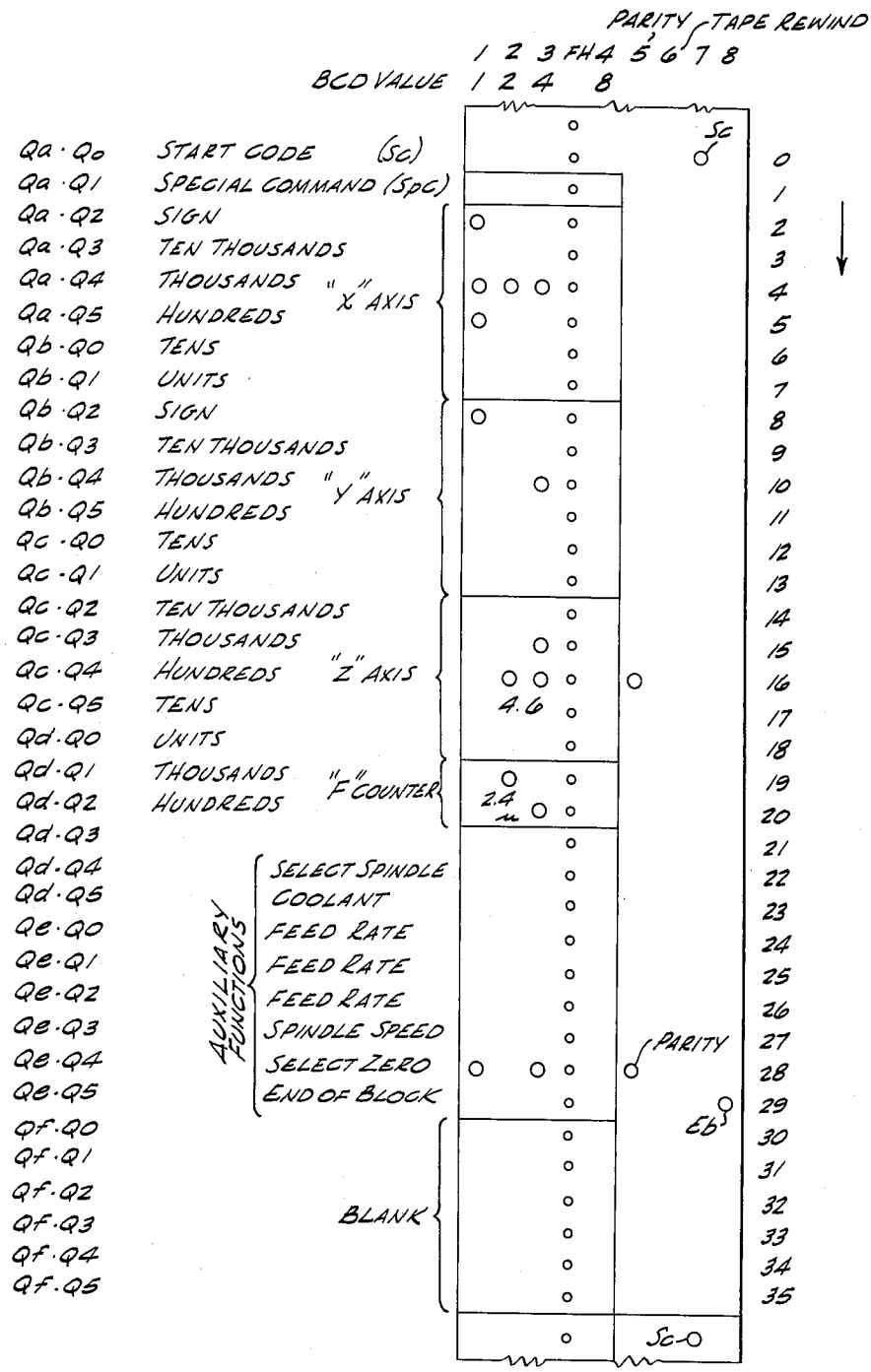

The invention will be better understood by reference to a typical tape format, see FIG. 2, which is used in programming the operation of a machine tool of the type herein described. In this illustration the tape is indicated as comprising eight columns of information, designated 1 through 8, and one feed hole column, designated FH. The tape is additionally divided into rows of information extending completely across the tape, each row including a feed hole. These rows of information are numbered 0 through 35 for a full tape block, for this specific example, and thereafter the row number sequence is repeated. An interblock space of 3 to 6 rows, herein marked "Blank," may be left between the blocks. Thirty-five rows do not have to be programmed. Only as many rows are programmed as are needed and then the end-of-block is marked. Columns 1, 2, 3 and 4 of the tape are utilized to record the dimensions for the movement of the machine axis and other items of information, such as tool selection (row 22) or certain special commands $S_pC$ (row 1) which deal with the sequencing of the control. Column 5 may be utilized for the purpose of a parity check. In the format indicated, the parity is odd. Column 7 is utilized to provide a start code signal Sc and column 8 is utilized to provide an end of block signal $Eb$. The start code marker, as indicated, is a hole positioned in column 7, row 0, of the tape.

The tape is read in the direction 0 through 35, as indicated by the arrow. Thus, the first signal produced by the tape as the tape is advanced through the tape reader is the start code signal Sc. Row 1 of the tape, as one of several special commands Sc, may include a provision for inhibiting setting of the position counters, for purposes not considered herein. Row 1 may also program a "delay" (not considered) in which one block of tape is read and further operation initiated by manual operation of a push button, for instance. Rows 2 through 7 of the tape include dimension information for positioning purposes.

In the tape format herein illustrated, positioning information is included for positioning a machine tool having 3 degrees of freedom, the respective axis being denoted the X, Y and Z axes. These axes are orthogonally related. The X and Y axes may be associated with the positioning of a machine table in two horizontal degrees of freedom, and the Z axis may represent the axis of freedom of a machine spindle, for instance. In this connection the rows 2 through 7 may include information concerning the sign (row 2) and the dimensional information for positioning a machine table in the X axis of freedom. Rows 8 through 13 may include the sign (row 8) and dimensional information for positioning the machine table along its Y axis of freedom. Rows 14 through 18 may include dimensional information, but not a sign marker, for positioning a machine tool spindle along the Z axis of freedom, which would be, in the case herein assumed, down and up with respect to a machine table therebeneath. As noted hereinabove, a dimension is also included for movement in the Z axis over which the positioning movement is to take place at feed rate. This dimension is programmed in rows 19 and 20. Rows 21 through 28 provide space for programming pluralities of auxiliary functions of the type therein indicated, including selective zero. These and other auxiliary functions may be employed.

Adjacent each group of dimensional information on the tape, the rows of information are marked in accordance with the binary decimal code to provide the decimal weighing of tens of thousands, thousands, hundreds, tens and units. Since the counted scale increment is 0.001 in., the dimension magnitudes indicated therefore represent total counts in terms of thousandths of an inch. The maximum dimension which may be indicated by an eighteen flip-flop counter, as used herein, is therefore 39,999 one-thousandths of an inch.

By way of example, the perforations indicated on the tape in row 4 are made in columns 3, 2 and 1 which have the binary coded decimal value 4, 2 and 1, respectively, which in the thousands row represent 7,000. In row 4, which is the hundreds row, a single perforation in column 1, which is weighted 1 in the binary coded decimal system of notation, therefore represents 100. The combined decimal notation, adding these two together, is therefore 7,100, specifying a dimension of 7.1 inches of movement in a particular axis. The notation, as indicated in rows 15 and 16 for the Z axis, represents a programmed dimension of 4.6 inches in the Z axis. This will be assumed as a programmed dimension from a predetermined zero position, either scale zero or a selected zero point, as will be described hereinafter.

The F counter dimension is programmed in rows 19 and 20, there being one perforation in column 2 of row 19 and one perforation in column 3 of row 20. As indicated adjacent rows 19 and 20, the F counter contains the thousands and hundreds sections. However, the F counter, unlike the X, Y and Z position counters counts only in 10ths of an inch, as will be described. The dimension which is indicated by the perforations in rows 19 and 20 is therefore 2.4 inches.

As will be seen by reference to row 28, the select zero lamp number is programmed. As indicated, perforations are provided in columns 1 and 4 which, according to the binary decimal code, represents the decimal number "5," indicating that lamp No. 5 has been selected. Row 29, column 8, presents a perforation identified E$b$, which indicates the end of the block of information which has been read by the tape for the purpose of controlling the machine in each of its three axes. The number of interblock spaces "Blank" is arbitrary and the row positions of these blank spaces varies with the amount of information that is written, since they follow the end of block marker. The block sequence may be repeated beginning again with row 0 and the start code marker S$c$.

GENERAL SYSTEM

With particular reference to FIG. 4, the system therein illustrated includes an information input block TRS. The information input equipment may include any suitable type of discrete signal programmer, as already noted. For the purposes of this discussion, it will be assumed to include a suitable tape reader system having a perforated tape of the type indicated in FIG. 2, which may be read by suitable photoelectric types of electric transducers. Under such circumstances the photoelectric transducers, such as self-generating photoelectric devices which are employed, occupy one of two impedance or voltage states when dark and a second impedance or voltage state when illuminated with light. In the arrangement herein described, the self-generating photoelectric devices are in the higher of their two voltage states when dark and in the lower of their two voltage states when light.

The output of such information input equipment, in the form of serially presented parallel signal groups, as received from a tape of the type of FIG. 1, is distributed by a suitable electrical control ECC to respective Z and F counting registers or position counters, designated ZPC and FPC, respectively. The discrete tape signals preset the position counters, the Z counter being set for 4.6 inches, as will be seen from FIG. 2, and the F counter for 2.4 inches, as also seen from FIG. 2.

The outputs of the Z and F counters are compared in a Z and F comparator circuit ZFC having an output when the counter contents are different, that is, the Z counter contents are greater than the F counter contents, which is applied to the electrical control circuit ECC. The electrical control circuit produces an output applied to feed axis drive FD effecting movement in the feed axis or spindle axis 2, as indicated by the dotted connection between the two named blocks.

The output of the feed axis, that is, its mechanical movement, operates a suitable transducer TD, herein indicated as including the magnetic heads HMz1 and HMz2. The output of this transducer is applied to a position count generator PCG which at scale zero, or a select zero position, generates the pulses $P_p$ or $N_p$ (see FIG. 3) which are applied via a count gate CG to the Z counter ZPC in such sense as to count down the Z counter from the number to which it has been preset by the tape through the electrical control ECC. At such time as the contents of the Z counter ZPC equal the contents of the F counter FPC the control provided by the Z and F comparator ZFC switches the feed axis drive FD to feed rate from rapid traverse and the movable member, in this case the machine spindle assembly 2, moves at feed rate until the Z counter reaches zero, or a predetermined minimum count, at which the spindle is properly positioned.

In an arrangement of the type described, provision may be made to provide for dwell at the end of the positioning movement, or provision may be made for automatic retraction at the time the positioning movement has been completed. In either case, the retract cycle is initiated, either after a delay or immediately. As will be seen by reference to FIG. 4, there is a connection from the Z counter to the F counter which is marked "count down F counter." As noted in connection with the description of FIG. 2, the F counter counts in tenths of an inch, while the pulses which are applied to count down the Z counter represent positioning increments of 0.001 in. The count increments of the Z counter also represent thousandths of an inch. Thus, the units and tens sections of the Z counter, as will be described hereinafter, are combined to provide an output signal each 100 pulse counts, to provide a count control of the F counter during retraction wherein a count down pulse is applied for each one tenth of an inch of retraction.

A zero sensing circuit FZG is coupled to the F counter to sense a zero count therein and has an output circuit coupled to the electrical control ECC to produce a control signal. Thus, when the F counter contents are zero, the control signal may be utilized to switch the feed axis drive from feed rate, in which it yet exists, to rapid traverse to complete retraction to zero, or to the limit of retraction in which the limit switch LS is actuated.

The select zero control SZ is also actuated by the output of the electrical control. The select zero circuits include suitable storage devices such as relays, for instance, which are controlled by the information from the tape. Thus, at the time row 28 on the tape is read, the output of the electrical control ECC operates suitable relays in the select zero circuits SZ to select a particular one of the zero transducer lamps L1 through L9.

The output of the select zero circuit is coupled into a zero transducer circuit ZT whereby this selection of a particular zero reference lamp is made. As indicated, the zero transducer circuit is also mechanically operated by the feed axis 2. This is representative of the operation of the lamps, as seen in FIG. 1, by movement of the machine spindle assembly, to thereby provide a facility for selecting a particular zero reference point.

The zero transducer circuit ZT has an output which is applied to a count enabling control circuit CEC. The output of count enabling control circuit CEC is coupled as input to a count gate CG and operates to enable this gate whenever the zero transducer operates. This latter output therefore inhibits the pulses $P_p$ or $N_p$ until the scale zero or select zero position is reached, the select zero position being that positioned defined by an illuminated lamp.

SPECIFIC SYSTEM

Figure 5:
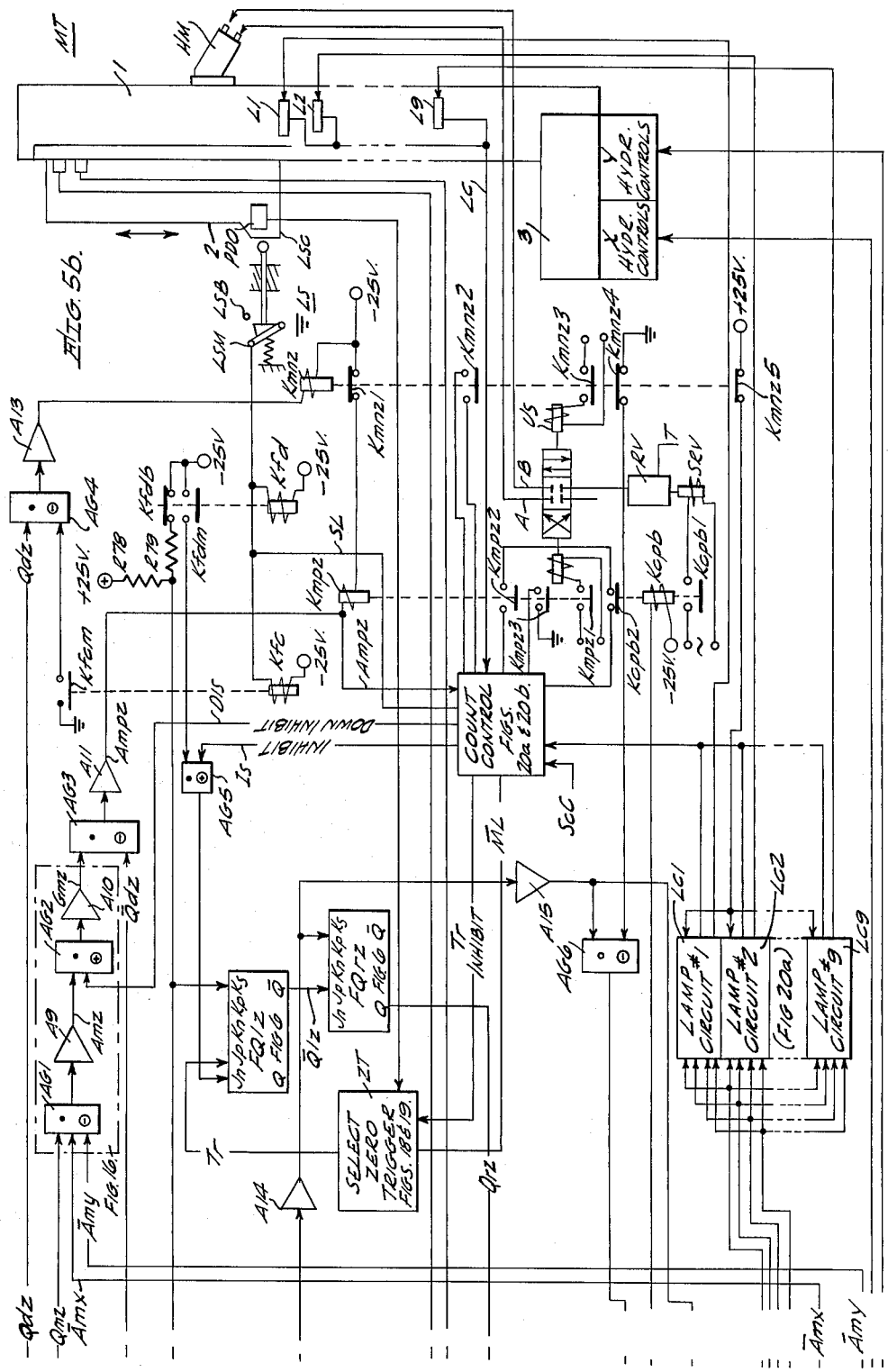
FIG. 5 illustrates the physical arrangement of the sheets of drawings containing FIGS. 5a and 5b.

The general organizational concept of the arrangement in FIG. 4 is embodied in FIGS. 5$a$ and 5$b$ which together illustrate the invention in greater detail. Here the tape reader system, generally designated TRS is illustrated as comprising a plurality of photodiode devices which are utilized in connection with suitable individual tape reader lamps, not shown, to scan the respective columns 1 through 8, including the row of feed holes, generally designated FH. The photodiodes which read the numbered columns of the tape are designated PD1 through PD8. The photodiode which reads the column of feed holes is designated PDFH. The photodiodes are coupled as inputs to respective amplifiers A1 through A8 and AFH. These may be conventional amplifiers having an output which is normally some predetermined negative value, in the absence of illumination by light from the associated diode, and having a higher value say zero volts or ground potential, whenever the associated diode is illuminated with light.

The outputs of the respective amplifiers A1 through A4 are coupled input-wise to respective diodes D1 through D4 forming part of a signal shaping network for producing the signals, generally designated A1, A2, A3 and A4, which are responsive to perforations in the tape in the information columns 1 through 4. This signal shaping network additionally includes respective clamping diodes CD1 through CD4 which clamp the negative excursions of the respective "A" signals at −2 volts. Pull-down resistors R1 through R4, each of which has a terminal commonly connected to a voltage supply of −25 volts, has its remaining terminal connected to the common terminal of the pairs of diodes in the respective signal shaping circuits. The output signals A1 through A4 therefore swing between −2 volts and ground each time the associated tape reading diode is illuminated with light.

The output circuits of the respective "A" signal circuits are coupled into the respective inputs of a second signal shaping network by means of respective diodes D5, D6, D7 and D8. Respective resistors R5, R6, R7 and R8 are connected to the anodes of the aforementioned diodes and the remaining terminals of these resistors are commonly connected to a supply of positive voltage, here designated +25 volts. The output circuits of this second network are designated E1C, E2C, E3C, E4C and produce signals E1 through E4.

The "A" signals are employed in conjunction with tape distributor signals, yet to be described, as inputs to relay gating circuits. The "E" signals, together with certain tape distributor signals, are applied as inputs to suitable flip flop gates.

The relay gates and the flip flop gates form part of a circuit, here designated as a block marked "distributor gates" and bearing the legend "DG." The distributor gates are utilized to route the information groups, received on a row-by-row basis from the tape as it is moving through the tape reader, to selected points in the system as determined by the logical gating of the distributor gate arrangement.

Identification of individual rows of information from the tape is achieved by means of a tape row counter, designated TRC, which is stepped synchronously with the tape under the control of signals derived from the feed hold amplifier AFH, in turn controlled by the feed holes on the tape. As earlier noted, and with reference to FIG. 2 the feed holes are aligned with each row of information which is on the tape. Thus, at any time an output signal is produced by the feed hole amplifier this indicates that a row of tape information is in position to be read. At this time the "A" signals or the "E" signals associated with the particular row of information on the tape are available for application to the system.

The tape row counter, by its particular electrical configuration, identifies the individual rows of the tape, and to this end, as will be described at a later point in connection with FIG. 7, includes flip flops arranged in a two-stage ring counter configuration, producing pairs of signals, each pair including one signal from each of its two stages, which are indicative of the particular row which is being read. The tape row counter is provided with a "Count" input connection and a "Reset" input connection. The "Count" input connection receives a signal, generally designated OFH and produced by a signal shaper circuit SSC, which is essentially an inverted rectangular wave which may swing between zero volts and some particular negative value of voltage selected for the system, say −2 volts. The positive going excursion of the trailing edge of the signal OFH is utilized to operate the counter, as will be described in connection with this counter and the flip flops therein, in reference to FIGS. 6 and 7 hereinafter. The signal shaper circuit SSC may be any suitable type of circuit, a particular type of which is illustrated in FIG. 10, yet to be described capable of receiving the output of the amplifier AFH, here represented as a signal AFS, and converting it to the inverted rectangular wave OFH indicated. While many forms of suitable signal shaping equipment are available, FIG. 10 illustrates a presently preferred form of circuit.

The tape row counter is arranged to be normally reset and to be insensitive to signals OFH when in reset condition and in the presence of a reset bias, and to be responsive to the signals OFH at such time as the reset bias is removed and a normal bias is applied thereto. To this end a tape block memory circuit TBM is provided which is capable of switching the voltage at the reset terminal between a low or negative voltage level capable of resetting and holding the counter in reset condition and a second high or positive voltage applied to the reset terminal which permits normal counting operation of the counter.

The tape block memory circuit TBM is controlled by the outputs of amplifiers A7 and A8, amplifier A7 producing an output in response to the start code marker Sc in column 7, row 0, of the tape, and amplifier A8 producing an electrical output applied to the tape block memory to switch it to its lower voltage state, say −150 volts, as indicated, in response to an end-of-block marker Eb in column 8 of the tape.

It will be recalled the start code marker Sc denotes the beginning of the block of information and the end-of-block marker Eb denotes the end of a block of information. The tape row counter TRC has sufficient capability to provide a minimum row count of 36 for the specific block of tape indicated herein. The capability of the counter, however, may be varied to suit individual conditions. Whether or not the entire block of information is utilized, that is, all 36 rows, will determine whether or not the counter is reset, say, at the end of 7 or 8 counts or at the end of, say, 29 counts, as shown by the end-of-block marker Eb in FIG. 2. The end-of-block marker Eb will be normally positioned on the tape at the end of the last row of information on the tape.

The output of the tape row counter TRC is represented in single signal circuits, here designated Rw1 through Rw35, each of which as will be explained hereinafter, comprises two signals from the output of the tape row counter. Since each row of information on the tape has a particular destination in the system the signals Rw1 through Rw35 may thus be combined with the "A" signals or the "E" signals in individual gates having outputs connected with specific system elements. Thus, for instance, a signal Rw15 comprised of signals Qc and Q3 (see FIG. 2) will be combined in respective gating circuits for signals E1, E2, E3 and E4 derived from columns 1, 2, 3 and 4, respectively, of row 15 of the tape and gated into the thousands level of the Z axis position counter ZPC of FIG. 5a. The four input circuits to the thousands level of this counter, as seen in FIG. 5a, denote the four input circuits over which the "E" signals are applied, as will be described in greater detail hereinafter in connection with FIG. 11.

Both the Z and F position counters are initially set so that all of the flip flops therein are in their "1" representing electrical states. This is accomplished by means of normally open contacts on respective relays KSZ and KSF which connect the flip-flop setting terminals to −150 volts, as indicated, to thereby set the flip flops to their "1" representing states. When row 1 of the tape is read the signals $Qa$, $Q1$ represented in the combined signal $Rw1$, energize the relays KSZ and KSF momentarily switching the set terminal of the counters to −150 volts in each case to provide flip-flop setting potentials to the counters. When these relays are de-energized the operating potentials of +25 volts are applied. As the tape is read, the presence of a hole in the tape is instrumental in maintaining a particular flip-flop which is in its "1" representing state in the same electrical state. The absence of a hole is instrumental in turning a flip flop off, that is, to its "0" representing electrical state. Thus, the information which is read from the tape is transferred to and stored in the flip flops of the respective counters, whence the Z axis position information is transferred to the counter ZPC, and the dimension over which the machine spindle assembly is to be operated at feed rate is transferred from rows 19 and 20 of the tape to the thousands and hundreds sections of the F counter FPC.

The zero output circuits of each of the Z axis position counter and feed rate counter are coupled into respective zero count indicating gates ZZG and FZG. Each of these gates produces a positive going output signal at such time as the counts in the associated counters are zero. The output of gate ZZG is used to reset a move flip flop FQ$mz$. The output of the F counter zero gate FZG or the gated output of flip flop FQ$mz$ terminates pulse counting and switches the system to rapid traverse during retracting of the machine spindle.

For the purposes of this portion of the discussion it may be mentioned that the flip flops employed in the counter and in the electronic control portion of this system, such as the flip flop FQ$mz$, are of similar character. These flip flops in their true states, that is, their "1" representing electrical states, have a low voltage on their Q output terminals. In their false or "0" representing electrical states their $\bar{Q}$ electrical terminals are in the lower of the two voltage states. Additionally, it may be assumed that these voltages swing between −2 volts and 0 volt.

The move flip flop FQ$mz$ and a directional flip flop FQ$dz$ are set to their "1" representing electrical states by the relay KSZ. When relay KSZ is energized to set the Z counter ZPC, −150 volts is also coupled to the S terminal of each of these flip flops. When the flip flop FQ$mz$ is in its "1" representing electrical state, that is, its Q output terminal is at the lower (−2 volts) of its two voltage states (Q$mz$), it indicates that movement in the feed axis under control may take place.

The convention adopted with respect to the directional flip flop FQ$dz$ is that movement negatively or upwardly in the feed axis, that is, upward movement of the machine spindle assembly, is indicated when the flip flop is in its "1" representing (Q$dz$) electrical state, that is, the output terminal Q is in the lower of its two voltage states. Downward movement is indicated when the $\bar{Q}$ electrical output terminal of the directional flip flop is in the lower of its two voltage states ($\bar{Q}dz$). The flip flop FQ$dz$ is switched to its "1" representing electrical state (Q$dz$) by the setting control of relay KSZ and also by the positive going excursion of the voltage on the Q output terminal of the move flip flop FQ$mz$ whenever the move flip flop is switching from its "1" representing electrical state (Q$mz$) to its "0" representing electrical state ($\bar{Q}mz$).

An additional control on the directional flip flop FQ$dz$ is provided by the voltage output of a resistor network controlled by the normally closed contacts K$fd$B of a feed relay K$fd$ controlled by the limit switch LS operated by the cam LSC on the machine spindle assembly. This resistor network comprising resistors R78 and R79 is coupled through the contacts K$fd$B from +25 volts to −25 volts and the relative resistance magnitudes of the resistors is such that their common terminal is at some negative voltage whenever the contacts K$fd$B are closed, and at some higher voltage, say at least ground potential, whenever the contacts K$fd$B are open. With reference to the machine tool schematically depicted in FIG. 5$b$, when the machine spindle assembly is in its limit of retraction, limit switch contacts LSB are open and the make contacts LSM are closed. In this circumstance the coil of the relay K$fd$ is connected between ground and −25 volts, as indicated, providing an energizing circuit therefor. This opens the contacts K$fd$B to disconnect the resistor network from −25 volts. Under this condition a positive voltage is applied to a terminal K$_s$ of the flip flop FQ$dz$ which switches this flip flop to its "0" representing electrical state ($\bar{Q}dz$), in which condition the $\bar{Q}$ output terminal is at the lower of its two voltage levels. Under this condition, which indicates positive or downward movement of the machine spindle assembly is to take place, the count gates CG are partially enabled preparatory to gating of pulses P$_p$ generated during downward movement of the machine spindle assembly.

The output of the resistor network is also coupled to the input terminal K$_s$ of a limit flip flop FQ$lz$ setting this flip flop to its "0" representing electrical state in which the output signal $\bar{Q}lz$ is low indicating the spindle assembly is in its limit of retraction. Signal $\bar{Q}lz$ is coupled to a J$_p$ input terminal of a flip flop FQ$rz$ which is presently in its "0" representing electrical state from a preceding cycle of operation. The negative change of signal Q$lz$ does not affect flip flop FQ$rz$. Since signal Q$rz$ is high the count gate CG is disabled and pulse gating is inhibited. Enabling of this count gate will be described following a description of the power means and controls therefor which provide movement of the spindle assembly.

Although any suitable type of power means may be employed to control the machine spindle assembly in its up and down movement, a hydraulic type of control has been herein illustrated for the purposes of convenience in discussion. Such a control may include a conventional rotary type of hydraulic motor, generally designated HM, which is mechanically coupled to the machine spindle assembly to effect up and down spindle movement under the control of hydraulic fluid under pressure applied thereto. Porting of hydraulic fluid to such a motor may take place under the control of a hydraulic valve capable of switching the ports of the hydraulic motor between a fluid pressure line and a tank, sump or drain, which receives the returning hydraulic fluid. Such a valve is schematically represented in FIG. 5$b$ and designated DV. It includes a pair of outlet ports A and B which may be selectively switched between the pressure port P and the tank or return line T. This is accomplished under the control of respective solenoid valves, designated US for the "up" solenoid and "DS" for the "down" solenoid. The arrows in the valve body adjacent the "up" solenoid and the "down" solenoid indicate the direction of coupling of the valve ports A and B with the pressure and tank ports, respectively. As the arrows indicate, when the "up" solenoid is energized pressure port P is coupled directly to outlet port A and the tank port T is coupled directly to the port B. When the solenoid DS is energized the ports A and B are crosscoupled to the ports T and P, respectively, whence the direction of flow of hydraulic fluid in the lines coupling ports A and B to the hydraulic motor is reversed. When both solenoids are de-energized there is no fluid coupling or communication across the valve and the hydraulic motor is de-energized.

Rate control of such a system may be obtained by the use of fixed orifices in the hydraulic circuit which may be shunted in any convenient manner under the control of a valve. Alternatively a servo operated valve may control rate from the programmed rate. A single stage of rate control has been illustrated herein in the interest of simplicity and is shown only as a block in the line T, designated RV, and representing a suitable type of rate valve. Operation of this valve is controlled by rate valve solenoid SRV which is switched by means of a rate relay K$cpb$. The normally open contacts K$cpb$1 of this relay couple a suitable source of alternating current to the coil of the rate valve solenoid. When the rate valve is de-energized, it provides fluid passage at a rate providing operation of the machine spindle at rapid traverse speed. When the rate valve is energized, fluid flow therethrough is restricted to some lower rate to provide machine spindle movement at a predetermined feed rate. Combinations of such valves having different flow resistances may be connected in parallel and operated individually or in combinations as programmed from the tape to provide pluralities of feed rates for different tools.

Up and down movement of the machine spindle assembly is controlled by means of directional control relays. The move positive or down relay is designated K$mpz$ and controls downward movement of the machine spindle assembly. The move negative or up relay is designated K$mnz$ and controls upward movement of the machine spindle assembly. The coil of relay K$mpz$ is coupled to a supply of —25 volts energizing potential through normally closed contact K$mnz$1 of the "up" relay to provide interlocking, preventing operation of relay K$mpz$ at any time that relay K$mnz$ is energized. Relay K$mpz$ is provided with a set of contacts, K$mpz$1, which connect the "down" solenoid DS of the directional valve to a suitable supply of alternating current at such time as the relay K$mpz$ is energized. Similarly, normally open contacts K$mnz$3 of the "up" relay connect the "up" solenoid US of the directional valve to a supply of alternating current when the "up" relay is energized.

The "up" relay is controlled along with other controls by the directional flip flop FQ$dz$. The output ($\overline{Q}dz$) of this flip flop is applied as input to one terminal of an AND gate AG3. The signal $\overline{Q}dz$ is in the lower of its two electrical states, namely —2 volts at the input to this AND gate.

Movement of the spindle assembly is normally inhibited until such time as positioning of the workpiece by movement of the work table in the X and Y axes has taken place. To this end there is indicated in FIG. 5a a block identified XPC, representing X position counter and controls and a block identified YPC, representing Y position counter and controls, both of which receive inputs from the distributor gates. These two systems may be of the same sort as described herein for positioning movement in the Z axis and are capable of producing output signals designated $\overline{A}mx$, $\overline{A}my$, which in this case are negative voltages, indicating that positioning movement in both of the X and Y axes has been completed.

Further and additional details of systems of the type for positioning in the X and Y axes may be had by reference to a copending application of E. J. Toscano, Serial No. 184,204, filed April 2, 1962, entitled Electrical System of Control, and assigned to the assignee of this invention.

The output signals $\overline{A}mx$ and $\overline{A}my$ are coupled to the input of an AND gate AG1 along with the signal Q$mz$ from the Q output terminal of the move flip flop FQ$mz$. The signal Q$mz$ indicates the flip flop is in its "1" representing electrical state, that is, at the lower of its two voltage states. All three negative signals on AND gate AG1 enable this gate, the output of which is coupled to a conventional amplifier A9 which may be a conventional transistor type of amplifier receiving a negative input voltage and producing an output voltage, which swings between some negative voltage when the amplifier is off and some higher voltage, say ground, when the amplifier is conducting, under the influence of the output of the AND gate AG1. The output signal of this amplifier is designated A$mz$.

The signal A$mz$ is one of two signals controlling down- ward movement of the machine spindle assembly. The other signal is a down inhibit signal DIS produced by a count control circuit CC. When downward movement is permitted signal DIS is at ground potential. This signal, along with signal A$mz$, is applied as input to an AND gate AG2 having an output circuit coupled to and controlling an amplifier A10. When the gate AG2 is "true," that is, both input signals at ground potential, the output of the amplifier is open circuited. When either or both of signals A$mz$ or DIS are absent or below gating potential, the output of amplifier A10 is grounded.

Amplifier A10 may be a conventional transistor amplifier which may be switched to conduction when an input below zero volts is applied thereto, and switched off whenever an input of zero volts or ground exits. The output of the amplifier A10 represented, for instance, in the collector circuit of such a transistor, may therefore switch between open circuit and ground potential, and in the present condition described will be open circuited.

A two input AND gate AG3 is controlled by signals G$mz$ and $\overline{Q}dz$. Signal G$mz$ when at ground potential inhibits gate AG3 and when absent permits gating of signal $\overline{Q}dz$, applying an input to amplifier A11, the output of which is designated A$mpz$, and is now switched to ground potential. This completes an energizing circuit for the coil of the move positive or down relay K$mpz$, which includes the now closed contacts K$mnz$1, to —25 volts. Relay K$mpz$ now picks up, closing its contacts K$mpz$1, K$mpz$2 and K$mpz$3, the contacts K$mpz$1 energizing the "down" solenoid DS to thereby initiate operation of the machine spindle downwardly. At this point the transducer assembly, including the scale S and the magnetic heads HM$z$1 and HM$z$2, begins to operate and with movement of the heads past the zero point on the scale, that is, the first groove on the scale, the magnetic heads produce electrical outputs which are applied to the pulse generator PG. The output of the pulse generator PG, now represented in pulses P$_p$, is applied as input to the count gates CG which at this time are partially enabled by the more positive or down signal $\overline{Q}dz$ from the directional flip flop FQ$dz$. If at this time it is assumed that a particular lamp, say L5, has been selected to establish the zero point on the machine spindle axis the signal Q$rz$, indicated as input to the count gates, is in the upper of its two voltage states and acts as an inhibiting signal on the count gates so that the pulses P$_p$ are not passed to the count input circuits of the Z position counter ZPC.

This count inhibiting action is provided by the count control circuits CC and zero trigger circuits ZT under the control, respectively, of the lamp selection circuits LC1 through LC9 and the zero photodiode PD0 indicated on the machine spindle. The zero trigger circuit produces two signals. One is designated $\overline{ML}$ and the other T$r$. In the absence of an inhibit signal, T$r$ Inhibit, the signal $\overline{ML}$ is instrumental in producing the signal T$r$. As will be seen, both the signal $\overline{ML}$ and the trigger signal T$r$, are signals which switch between two voltage states, namely, about ground or zero volts and —2 volts. When there is no light on the zero photodiode PD0 the signal $\overline{ML}$ is at the upper (zero volts) of its two voltage states. The trigger signal is now also in the upper of its two voltage states and as such is unable to trigger the limit flip flop FQ$lz$. This flip flop is controlled by the resistor network R78, R79 and as earlier described has been set to its $\overline{Q}$ (zero) electrical state by the potential applied to terminal K$_s$. Thus, the electrical output $\overline{Q}lz$ is at the lower of its two voltage states at this time. Inasmuch as a positive going voltage pulse is required to trigger the flip flop, the trigger signal T$r$ which is now at zero or ground volts, is ineffective to cause this triggering action.

An inhibit signal IS from the count control circuit CC is coupled to an AND gate AG5, the other input of which includes the normally open contacts K$fd$M of the feed relay K$fd$. These contacts when closed couple the associated input to the AND gate AG5 to −25 volts, and, as seen in FIG. 20b, yet to be described, clamp operate to the gate output at about −2 volts. The output of this AND gate is coupled to an input terminal $J_n$ of the flip flop F$Qlz$. The inhibit signal from the count control circuit CC is also a signal which occupies one of two voltage states. This signal is normally at some high voltage level which may be above ground potential and when a lamp is selected and the lamp is energized this signal is clamped to −2 volts. The AND gate AG5 is effective to couple a positive going voltage to the $J_n$ input terminal of the flip flop F$Qlz$ at such time as the inputs thereto are not at a low voltage level. Thus, if no lamp establishing a selected zero has been programmed, at such time as the machine spindle assembly moves out of its limit and the feed relay K$fd$ is deenergized, the removal of −25 volts in the input of AND gate AG5 permits the gating of the presently high inhibit voltage to the $J_n$ input terminal of the flip flop F$Qlz$ to trigger this flip flop to its "1" representing electrical state, and, as a consequence, the $\overline{Q}$ terminal swings from −2 volts to ground or zero volts. The signal $\overline{Q}lz$ in this positive going excursion is coupled to a $J_p$ input terminal of the flip flop F$Qrz$ which triggers this flip flop to its "1" representing electrical state in which the output terminal Q goes to the lower of its two electrical states. Signal Q$rz$ is now at the lower of its two voltage levels and enables the count gates.

Assuming now that a lamp selection had been made, for example, assume that lamp 5 had been selected, this lamp, under the control of the zero switches and the lamp selection circuits, is energized prior to the time that the machine tool spindle moves out of its limit. The contacts K$fd$M are therefore still closed at the time this lamp selection is completed. When the lamp selection is made and a particular lamp is energized, the lamp circuit LC which is coupled to the count control results in dropping of the inhibit signal IS to the lower of its two voltage states. As the machine tool spindle moves out of limit and the limit switch is actuated, deenergizing feed relay K$fd$, no voltage is gated to the input of the flip flop F$Qlz$ and consequently this flip flop remains in its $\overline{Q}$ ("0") electrical state, as does the flip flop F$Qrz$. The machine spindle assembly thus moves without the pulses $P_P$ being applied as input to the Z position counter ZPC. At such time as the zero photodiode PD0 moves past the lighted lamp and is illuminated a pulse signal is applied to the zero trigger circuit ZT. This signal normally swings the signal $\overline{ML}$ from ground to the lower of its two voltage states and then back to ground. At this time the signal T$r$ Inhibit is absent and the trigger signal T$r$ is produced and undergoes an excursion similar to the signal $\overline{ML}$. The positive going excursion of trigger signal T$r$ as photodiode PD0 passes the lighted lamp, applied to the $J_P$ input terminal of the flip flop F$Qlz$ triggers this flip flop from its $\overline{Q}$ ("0") electrical state to its Q ("1") electrical state. The positive going excursion of the signal $\overline{Q}lz$ triggers the flip flop F$Qrz$ from its "0" representing electrical state to its "1" representing electrical state. The signal Q$rz$ applied to the input to the count gates therefore enables gating of the pulses $P_P$ to the count input of the Z position counter.

As the machine spindle moves downwardly the pulses $P_p$ count down the Z position counter. The hundreds, thousands and ten thousands levels of the Z position counter are counted down through a Z count gate AZC which is enabled by the down directional signal $\overline{Q}dz$ from the directional flip flop F$Qdz$. Thus, with the occurrence of the positive going trailing edge of the zero output signal of the last flip flop in the tens level of the Z position counter, a positive going signal is gated through the Z count gate AZC to the count input circuit for the hundreds, thousands and ten thousands level of the Z position counter. The count signal which is gated by the count gate AZC is designated $\overline{Q}z8$, representing the output of a flip flop F$Qz8$ which is the highest order flip flop in the tens level of the counter (FIG. 8). This technique of driving the higher levels of the counter is utilized to permit switching of the units and tens levels of the Z position counter as input to count down the F position counter FPZ whenever the spindle is being retracted. This latter control is effected through an F count gate AFC which is enabled by the "up" directional signal Q$dz$ of the directional flip flop F$Qdz$.

The thousands and hundreds levels of the Z position counter, having the same dimensional significance as the thousands and hundreds levels of the F position counter, are compared in a comparator circuit ZFC which is utilized to control a rate relay. At such time as the count remaining in the Z position counter equals the count which is programmed in the F position counter FPC, the comparator ZFC enables an energizing circuit for the latching coil L of a rate relay K$cpa$. This relay now picks up and latches, closing its normally open contacts K$cpa$1 to complete an energizing circuit from ground to −25 volts through the coil of a second rate relay K$cpb$, earlier referred to, which now energizes the coil of the solenoid SRV of the rate valve. This actuation of the rate valve switches the hydraulic motor HM from rapid traverse operation to feed rate and the machine spindle moves at feed rate until the Z position counter is counted to zero.

At the time the count in the Z position counter reaches zero, the input signals to the Z zero gate ZZG enable this gate. The resulting output signal, here designated $\overline{Z}$, swings from a negative potential, say −2 volts, to approximately ground or 0 volts. The signal $\overline{Z}$ is coupled to a $K_n$ input terminal of the move flip flop F$Qmz$. This positive going signal on a K input terminal of this flip flop triggers the flip flop to its $\overline{Q}$ (zero) electrical state. The signal $\overline{Q}mz$ which had previously been at 0 volt now swings to about −2 volts. The negative signal $\overline{Q}mz$ is applied to an AND gate AGR having as its other input a ground potential signal applied by a set of normally closed contacts K$r$1 of a fast retract relay K$r$. If fast retract is programmed, relay K$r$ is energized. The ground signal is removed from gate AGR. The negative output of gate AGR is gated by an OR gate OG1 to the input of a conventional amplifier A14. The output of the amplifier A14, which is normally at some negative voltage, now swings positive towards ground potential. This positive going excursion which is coupled to a $K_P$ input terminal of the flip flop F$Qnz$ triggers this flip flop to its $\overline{Q}$ (zero) electrical state removing the gate enabling signal Q$rz$ from the count gates and inhibiting counting at this time.

Switching of the flip flop F$Qmz$ to its $\overline{Q}$ (zero) electrical state also results in a positive going voltage excursion at its Q electrical terminal which is coupled to the $J_P$ input terminal of the directional flip flop F$Qdz$. This positive going signal now triggers the directional flip flop to its "1" representing electrical state in which the signal Q$dz$ is at about −2 volts which is the gate enabling voltage for the F count gate AFC and also the count enabling voltage for the count gates for gating signals $N_p$.

The output of the amplifier A14 is also gated as input to an amplifier A15 which inverts the positive going signal used for triggering the flip flop F$Qrz$ producing a negative signal (or open circuit) at the input to an AND gate AG6, the output of which is coupled through the unlatching coil of rate relay K$cpa$ to ground. The other input terminal of AND gate AG6 is yet connected to ground through normally closed contacts K$mnz$4 of the "up" relay, and gate AG6 is therefore presently disabled.

The Z and F position counters are now reset by means of a relay K$rz$. This relay is controlled by an amplifier A16 which in turn is controlled by the amplifier A15.

This amplifier, when it is switched on, connects the coil of the reset relay Krz between −25 volts and ground. Relay Krz now closes its normally open contacts to couple −150 volts into the reset terminals of both the position counter FPC and the position counter ZPC which now both indicate zero.

With switching of the flip flop FQmz to its $\bar{Q}$ ("0") electrical state indicating that Z positioning movement is completed the signal Qmz is switched from −2 volts to 0 volt or ground. This disables the AND gate AG1 and the signal Amz which was at ground potential now swings to some negative voltage. This negative going voltage results in a drop in the output of the AND gate AG2 which drives the amplifier A10 to conduction. The output signal Qmz is now at ground potential. The signal $\bar{Q}dz$ is now also at ground potential. As a result the AND gate AG3 is disabled and the amplifier A11 cut off. At this time the "down" relay Kmpz is deenergized.

Since the machine spindle assembly is at the bottom of its programmed stroke the feed relays Kfd and Kfc are deenergized. The signal Qdz which is now in the lower of its two voltage states is applied as input to one input terminal of an AND gate AG4. The other input terminal of the AND gate AG4 is coupled to the contacts KfcM of the feed relay Kfc. These contacts when closed connect the associated input circuit of gate AG4 to ground. Inasmuch as the contacts KfcM are presently open this input circuit is open circuited and the signal Qdz controls the gate. Amplifier A13 is therefore energized and its output circuit is switched to ground. This completes an energizing circuit directly through the coil of the "up" relay Kmnz to −25 volts energizing the "up" relay. Energization of the "up" relay opens contacts Kmnz1, opening the interlock in the coil circuit for the "down" relay. Contacts Kmnz2 close completing a partial energization circuit for one of two upper simulator relays in the count control circuit, yet to be described, for the purpose of grounding the coils of the two feed relays whenever the energized light is sensed by the zero photodiode PD0 during a retracting operation, to operate these relays independently of the limit switch at the selected zero point. Contacts Kmnz3 connect the "up" solenoid US of the directional valve to the supply of alternating current indicated, porting hydraulic fluid to the hydraulic motor HM in a direction to retract the machine spindle assembly. Contacts Kmnz4 disconnect the associated input of AND gate AG6 from ground which enables the gate AG6 completing an energizing circuit for the unlatching coil U of the relay Kcpa. Deenergization of this rate relay deenergizes the rate relay Kcpb which in turn deenergizes the rate valve and the hydraulic system is transferred to rapid traverse operation for retraction of the machine spindle.

If selective zero has not been programmed, the machine tool continues in fast retract into its upper limit, at which time the limit switch LS is actuated. When contacts LSM thereof close, the relays Kfd and Ffc are energized. Energization of relay Kfc grounds the input of the AND gate AG4 which in turn cuts off amplifier A13 deenergizing the relay Kmnz. Contacts Kmnz3 deenergize the "up" solenoid of the directional valve DV which stops upward movement of the machine spindle.

If a zero point other than the limit of retraction had been programmed selecting, say, a position indicated by lamp L5, the count control circuits CC would have been instrumental in grounding the circuit SL which simulates the upper limit of retraction. Grounding of this circuit, it will be noted, completes an energizing circuit for the coils of the relays Kfd and Kfc independently of limit switch position. Grounding of this circuit is initiated by the photodiode PD0. As earlier noted when the photodiode PD0 is illuminated with light the signal $\overline{ML}$ goes through a negative cycle. At this time, the output signal $\overline{ML}$ of the zero trigger ZT applied to the count control circuit is instrumental in initiating operations therein to produce grounding of the circuit SL, as will be explained hereinafter. Thus the relays Kfd and Kfc, in selective zero control, are again instrumental in stopping movements in retraction, but, in this instance, just after the photodiode PD0 has moved past the particular light which is lighted.

If it had been desired to retract at feed rate in either of the scale zero or select zero modes of operation, the relay Kr would have been left deenergized. Thus its contacts Kr1 are now closed which grounds the connected input of the AND gate AGR disabling this AND gate which inhibits the signal $\bar{Q}mz$. Thus, at the time the Z position counter goes to zero and the Z zero gate ZZG generates the $\bar{Z}$ signal which triggers the flip flop FQmz to its $\bar{Q}$ ("0") electrical state, the signal $\bar{Q}mz$ is not gated by the AND gate AGR. Consequently, the flip flop FQrz is not switched and the count gate control signal Qrz remains. The rate relay Kcpa, which was energized at the time the count in the Z position counter equalled the count in the F position counter, now remains energized, lacking a signal by amplifier A15 on its unlatching coil. Consequently, the rate valve RV remains energized and the system remains in the feed rate mode of operation.

The relay Kmnz is energized as previously described when the flip flop FQmz is triggered, which triggers the directional flip flop FQdz. The directional valve DV now applies hydraulic fluid under pressure to the motor HM in such a way as to retract the spindle along the feed axis.

During this retract operation the pulse generator, as described in application, Serial No. 850,436, above identified, now produces the pulses $N_p$ which are gated by the enabled count gates CG to the count input of the Z position counter ZPC. Since the signal $\bar{Q}dz$ is high at this time the Z count gate AZC is disabled. Since signal Qdz is low, the F count gate AFC is enabled.

With each positive going excursion of the signal $\bar{Q}z8$ from the tens section of the Z position counter, one pulse is applied to the count input of the F position counter FPC via the AND gate AFC. This count down operation continues until such time as the F zero gate FZG generates the $\bar{F}$ signal indicating that the contents of the F position counter are zero. This signal, which is gated by the OR gate OG1, operates amplifier A14 which triggers the flip flop FQrz to its "0" representing electrical state, disabling the count gates CG. At the same time, the amplifier A15 via AND gate AG6 energizes the unlatching coil of rate relay Kcpa to de-energize the rate relay and drop the rate valve RV. Retract operation continues in rapid traverse at this point until such time as one of the lamps L1 to L9, say L5, is sensed if selective zero is programed, or until such time as the limit switch LS is actuated in the limit of retraction, all as previously described.

A better understanding of this invention will be had by reference to circuits illustrating certain details of the system which are covered only in block form in FIGS. 5a and 5b.

Flip flops

To this end reference is made to FIG. 6 illustrating a typical flip flop which may be employed herein. This flip flop comprises a pair of PNP type transistors designated Qf1 and Qf2 connected in grounded emitter configuration. The base and collector circuits of these transistors are cross-coupled into respective voltage divider networks connected between +25 volts and −25 volts, as indicated. The voltage divider network on the right side of the flip flop as viewed includes resistors R3, R4 and R5 in series. The voltage divider on the left of the flip flop comprises resistors R6, R7 and R8. Resistors R4 and R7 are shunted, respectively, by coupling capacitors C2 and C1. The collector circuits are coupled to −2 volts through clamping diodes CD1 and CD2. The respective output circuits, which are terminals coupled to the respective collector circuits, are conventionally designated Q and $\overline{Q}$. The "1" representing electrical state of the flip flop exists when the transistor $Qf1$ is conducting and the transistor $Qf2$ is nonconducting. At this time the terminal $Q$ is clamped to $-2$ volts and the terminal $\overline{Q}$ is coupled to ground through the conducting transistor $Qf1$. When the flip flop is in its "0" representing electrical state, the potentials at the terminals $Q$ and $\overline{Q}$ are reversed and transistor $Qf2$ is conducting and the terminal $Q$ is coupled to ground potential. The clamping diode CD2 clamps the terminal $Q$ to $-2$ volts. Steering is achieved by means of resistors R1 and R2 coupled between the collectors and bases of the respective transistors through respective diodes D1 and D2. The flip flop is triggered by means of positive going voltage pulses usually voltages which are swinging in a positive direction from a potential of about $-2$ volts, although a more negative voltage may be used, toward ground or zero volt. These triggering voltages are coupled to the flip flop through pairs of terminals such as $J_p$, $K_p$ and $J_n$, $K_n$. Coupling capacitors C2b, C1b and C2a, C1a are included in series in each of these circuits, the coupling capacitors having common electrodes connected to the anodes of the respective coupling diodes, as indicated. Additional control inputs are provided to the base of the transistor on the K side of the flip flop, that is, the transistor $Qf1$ through terminals T and $K_s$. The terminal T is a triggering terminal coupled through a polarizing diode D5 and a capacitor C4 to the base of the transistor $Qf1$. The terminal $K_s$ is coupled through a polarizing diode to the base of the transistor $Qf1$. An additional control terminal 8In is coupled through a capacitor C3 and a diode D3 to the base of the transistor $Qf1$. Terminals S and R are normally at about $+25$ volts during operation of the flip flop. However, these terminals may be used for setting and resetting the flip flop under certain conditions. For instance, the relay K$rz$ of FIG. 5a, when energized, couples $-150$ volts to the reset terminals of flip flops of both the F and Z position counters. This connection is to terminal R of each of the flip flops in these counters. The relays KSZ and KSF when de-energized couple $-150$ volts to the S input terminals of the flip flops of the Z counter and the F counter, respectively. The arrangement is such that a negative voltage is coupled either to the base of the transistor $Qf1$ or $Qf2$ whenever the $-150$ volts is applied to one of the terminals S or R. This negative voltage is of sufficient magnitude to strongly drive that particular transistor to conducting condition if it is not already conducting, contrary to the positive going voltage applied to other terminals of the transistor for the purpose of cutting off the transistor. Thus, the application of the set voltages to the F and Z position counters FPC and ZPC is a negative voltage application to the terminals S of all of the flip flops forcing transistor $Qf1$ of the respective flip flops to conduct, setting each flip flop into its "1" representing electrical state with the terminal $Q$ at $-2$ volts and the terminal $\overline{Q}$ at zero volt.

*Tape row counter*

As earlier mentioned herein, the tape row counter comprises two interconnected ring counters, each of which includes six flip flops. The first ring counter includes flip flops FQ0 through FQ5, and the second ring counter includes flip flops FQa through FQf. These flip flops individually may be the same as that described in FIG. 6. However, all of the terminals indicated on the flip flop in FIG. 6 are not utilized in the circuit connections among the various flip flops. As indicated in the figure the input terminal T is used to trigger the flip flops in the tape row counter TRC. Further, as illustrated, the Q output terminal of each of the flip flops is connected to the J input terminal of the next higher order flip flop in the chain in both sections of the counter. Additionally, the Q output terminal, designated Q5 of the flip flop FQ5 is connected through a coupling diole to the input terminals T of the flip flops FQa through FQf and is connected directly to the J input terminal of the flip flop FQ0. A voltage of $+25$ volts is connected to the R input terminal of each of the flip flops FQ0 and FQa, and to the S terminals of the remaining flip flops of both counter sections. The S terminal of flip flop FQ0 and the S terminal of flip flop FQa are connected in a circuit with the R terminals of the remaining flip flops of both sections of the counter. This circuit is connected to $-150$ volts through the normally closed contact K$h$B of a relay K$h$. This sets the flip flops FQ0 and FQa into their "1" representing electrical states and the remaining flip flops in the counter to their "0" representing electrical states. The counter configuration using conventional Boolean notation may therefore be defined as Q0Qa denoting row zero (R$w$0) of the tape. Relay K$h$ is similar to relay R$h$ of application FIG. 10 of Serial No. 184,204, above. Relay K$h$ may also be a simple latching relay for some purpose, having a latching coil energized by the start code signal Sc and an unlatching coil energized by the end-of-block signal E$b$.

FIG. 12 shows the relationship of the flip flop signals and the signal OFH. The counter is operated by the timing or feed hole signal OFH. This signal is applied to all of the T input terminals of the flip flops FQ0 through FQ5, constituting the first section of the counter. The positive going portion of the signal OFH switches the flip flop FQ0 from its "1" representing electrical state to its "0" representing electrical state. As the flip flop FQ0 switches to its "0" representing electrical state the positive going excursion of the Q0 voltage applied to the J input terminal of flip flop FQ1 drives the flip flop FQ1 to its "1" representing electrical state. The connection indicated on the J input terminal of the flip flop here signifies a connection to either the terminals $J_p$ and $K_p$ or $J_n$ and $K_n$ in the flip flops shown in FIG. 6. The steering provided within each flip flop assures that the flip flop will always trigger from its existing electrical state to its opposite electrical state with the simultaneous application of voltage to both of the J and K input terminals. With the next occurrence of a signal OFH the flip flop FQ1 is triggered from its "1" representing electrical state to its "0" representing electrical state. Thus, the flip flops are selectively switched from their "0" representing electrical state to their "1" representing electrical states and back to zero.

Each time the flip flop FQ5 switches from its "1" representing electrical state to its "0" representing electrical state a trigger signal is coupled to the input terminals T of all the flip flops FQa through FQf to thereby step this section of the flip flop one count for each six counts of the first section. The counter configurations for the respective rows of the tape are indicated adjacent the tape rows in FIG. 2 and reference may be had thereto to identify a particular row of tape. Row R$w$1, for instance, is represented by counter configuration Qa.Q1. Row R$w$15, referred to hereinabove, is represented by the counter signals Qc.Q3, which is the thousands row of the tape for the Z position counter. Similarly, row R$w$28 is identified by Qe.Q4, to thereby provide signal combinations indicative of particular rows of the tape. When the counter is in the configuration Qf.Q5 this represents the maximum count capability of the counter corresponding to row R$w$35 of the tape. The positive going excursion of the Q5 voltage triggers the flip flop FQ0 to its "1" representing electrical state and, similarly, the positive going excursion of the voltage Qf triggers the flip flop FQa to its "1" representing electrical state, restoring the counter to its normal preset configuration.

*Position counter*

The position counter is illustrated in FIG. 8 and, as in the case of FIG. 7, the flip flops are here also designated as blocks. The respective terminals $J_n$, $J_p$, $K_n$, $K_p$, etc., are indicated inside of the several flip flop blocks.

This is a binary coded decimal counter and it comprises flip flops FQz1 through FQz18. Through the thousands level it is divided into groups of four flip flops. The flip flops FQz1 through FQz4 are the units flip flops, the flip flops FQz5 through FQz8 are the tens flip flops, the flip flops FQz9 through FQz12 are the hundreds flip flops, the flip flops FQz13 through FQz16 are the thousands flip flops and the flip flops FQz17 and FQz18 are the ten thousanrs flip flops. This gives the counter a counting capability of 39,999 which, in the present instance, represents thousandths of an inch. In operation this counter is provided with connections whereby all of the flip flops are initially set to their "1" representing electrical states prior to the time that information concerning a particular dimension is inserted therein. At any time a row of information is being read the absence of a hole at a particular point on the tape is effective to turn off the corresponding flip flop.

The gating is such that each four bits of dimensional information in a single row is read simultaneously and inserted into the respective flip flops. The lowest number flip flop in each row of the counter corresponds to the first column of the tape and the highest number flip flop in each row corresponds to the last information column of the tape, that is, column 4.

The counter is connected for count down operation and is operated as a binary coded decimal count down counter. In accomplishing this each $\bar{Q}$ terminal of a flip flop is coupled into both the $J_p$ and $K_p$ input terminals of the next higher order flip flop in the counter with the exception of flip flop FQz18. The $J_p$ and $K_p$ terminals of the flip flop FQz1 are coupled to the outputs of the count gate CG, the output pulses of which trigger this flip flop in synchronism with pulse generation.

Binary coded decimal count down operation is achieved in each row by suitable interconnection of the circuits 8I$n$ of the "2" weighted and "4" weighted flip flops with the $\bar{Q}$ terminal of the "8" weighted flip flop in each instance. With reference to the units row of the flip flops the terminal $\bar{Q}$ of the "8" weighted flip flop FOz4 is coupled to the 8I$n$ input terminals of both the "2" and "4" weighted flip flops FQz2 and FQz3. When this row of flip flops is in the 0000 configuration, the next succeeding pulse NP or PP on the inputs of the flip flop FQz1 switches this flip flop to its "1" representing electrical state. When flip flop FQz4 switches to its "1" representing electrical state the positive going voltage $\bar{Q}z4$ coupled to the 8I$n$ terminals of the flip flops FQz2 and FQz3 switches these flip flops from their "1" representing electrical state to their "0" representing electrical states. The configuration of a units row is now 1001, or decimal number 9. Similar considerations apply to the tens, hundreds and thousands flip flops.

*Position counter control*

Setting of the Z and F position counters to their "1" representing electrical states is accomplished as generally indicated in FIG. 5a, by the closing of contacts of the KSC and KSF relays to couple −150 volts to the set input terminals S (FIG. 6) of each of the flip flops in the respective counters. As indicated, this setting operation is accomplished through relay gates which are connected to the coils of these relays. Since setting is to take place prior to the time that information is read from the tape which is to be stored in these flip flops, the setting operation takes place on row 1 of the tape.

A typical gating circuit for this operation is illustrated in FIG. 9. The signal timing is shown in FIG. 12. Here, row 1 of the tape is identified by the signals Q$a$ and Q1 which are coupled to a negative AND gate having a pull down resistor R35 connected to −25 volts. A diode D37 couples an amplifier feed hole signal OFHA into this gate. As indicated in FIGS. 9 and 12, the signals Q$a$ and Q1 swing between zero volts and −2 volts, which is typical of the output voltages of flip flops in this system, and in their negative voltage states represent the true states of the flip flop. The signal OFHA is an interrupted ground potential signal which is synchronized with the feed hole signal OFH and, as shown in FIG. 5a, is produced by the output of an amplifier AFH2 having an output transistor switched between conducting and nonconducting condition under the control of the feed hole signal OFH. The output of this AND gate is coupled through respective resistors R36, R39, R41, R43 and R45 to the bases of respective emitter follower transistors A20, A21, A22, A23,, and A24. The emitter circuits of respective transistors A20 through A23 are coupled to the respective circuits producing the signals A1 through A4, as shown in FIG. 5a. The base circuits of the respective transistors are completed by resistor coupling to +25 volts through respective resistors R37, R40, R41, R44 and R46.

Any one of the named transistors is biased to conduct whenever the output of the gate circuit is low, say −2 volts. At any time the output of the gates is high, say ground or zero volts, the transistors are biased to cut off. Thus, at such time as signals typically represented as $Qa.Q1$ are applied to the AND gate and the ground signal OFHA on the gate input terminal through diode D37 is interrupted or temporarily removed, the output of the gate will be low. Any transistor now having a grounded emitter will conduct. Ground potential on the emitter of transistor A24 is permanently coupled thereto. Thus, this transistor, unlike the rest, will conduct each time the output of the gate is low. The remaining transistors have the additional requirement that a signal A1, A2, A3 or A4, respectively, at ground potential, must be present when the gate output is low for operation to take place. Inasmuch as the transistors A20 and A23 are not employed in the operation of the KSZ and KSF relays no connections are shown therefor.

The collectors of transistors A21 and A22 are coupled through diodes D38 and D39 in parallel to one terminal of a pull down resistor R38 of an OR gate OG, the other terminal of the resistor being connected to −25 volts. Conduction of either of these transistors thus pulls up the terminal of the resistor R38 to approximately the potential of the signal on either of the circuits A2 or A3, in this instance indicated as ground potential. The output terminal of OR gate OG is directly connected to the base of a transistor A25, the collector of which is directly connected to −25 volts. The emitter of transistor A25 is connected through coils of the KSZ and the KSF relays in parallel with the collector of transistor A24.

Normally, the relays KSZ and KSF will be de-energized. In their de-energized conditions, as will be seen by reference to FIG. 5a, these relays apply +25 volts to the set terminals of the flip flops of the respective counters. When these relays are energized they respectively couple −150 volts to the set terminals for switching the flip flops to their "1" representing electrical states. In the absence of an output from OR gate OG the base of the transistor A25 is at a negative potential. At such time as the output of the gate is low the transistor A24 conducts. This couples the emitter of transistor A25, now operating as an emitter follower, approximately to ground potential and the transistor A25 by reason of its negative base bias conducts, which momentarily energizes both of the relays KSZ and KSF to set the two counters. Setting operation of the counters may be inhibited by programming a signal A2 or A3 in row 1, column 2 or 3, of the tape. When this happens the output of the OR gate is high and at such time as the output of the AND gate goes low biasing transistor A24 to a conducting condition the emitter follower A25 is biased off so that the counter setting relays are not energized.

The signal OFHA is controlled by the signal OFH so that synchronous operation may be maintained. A typical circuit for accomplishing this is shown in FIG. 10 illustrating diagrammatically the details of the entire signal shaper circuit and amplifier AFH2 shown in block form in FIG. 5a. The signal shaper circuit includes a trigger comprising transistor A26 and A27 connected in common emitter configuration to ground through a resistor R50. Conducting bias is applied to the base of transistor A26 through a resistor R51 connected to −25 volts. The collector of transistor A27 is connected to −25 volts through a resistor R52. The collector of transistor A26 is connected to −25 volts through a resistor R55 forming a part of a voltage divider network between +25 volts and −25 volts and including additionally in series the resistors R53 and R54. The common terminal of resistors R53 and R54 is connected to the base of the transistor A27 and provides base bias therefor. The common terminal of resistors R54 and R55 represents the output of the trigger circuit and is connected by means of a capacitor C20 to the base of a transistor A28 forming part of a multivibrator circuit with a transistor A29. This circuit is connected as a one-shot multivibrator and is normally biased by a resistor R60 connecting the base of transistor A29 to −25 volts so that the transistor A29 conducts. Transistors A28 and A29 are connected in grounded emitter configuration. The collector of transistor A28 is coupled to the base of transistor A29 through a coupling capacitor C22. Similarly, the collector of transistor A29 is coupled to the base of transistor A28 through a coupling circuit including a resistor R57 and speed-up capacitor C21. A resistor R59 also couples the collector transistor A28 to −25 volts. The collector of transistor A28 is further connected to ground through a Zener diode ZD1. The biasing arrangement on this circuit in the absence of an input signal from the trigger normally maintains the transistor A29 conducting, in which case the output signal OFH is at approximately ground potential and is coupled out of the circuit through a diode D50. The collector circuit of transistor A28 is coupled by a diode D51 to a resistor R62 which in turn is coupled to the base of a transistor AFH2 which produces the output signal OFHA. The common terminal between the diode D51 and resistor R62 is coupled by a resistor R63 to −25 volts. The base of the transistor AFH2 is coupled through a resistor R61 to +25 volts.

With the biasing arrangement described at the base of the transistor AFH2 the voltage drops across the resistors R61, R62, and R63 are such as to maintain the transistor AFH2 normally conducting when the one-shot multivibrator is in its normal electrical state. At the time a feed hole signal AFS appears at the input to the trigger, the transistor A26, which is normally conducting, is now switched off. The potential on the collector circuit now falls from ground potential in a negative direction to the potential provided by the voltage divider network at the common terminal between the resistor R54 and R55. This negative going voltage is coupled to the base of transistor A28 of the one-shot multivibrator by the capacitor C20 and the negative going pulse biases the transistor A28 momentarily to conduction. This pulls the collector up to ground potential and at the same time via the coupling provided by capacitor C22 cuts off the transistor A29. The rising collector voltage which is coupled into the base of the transistor AFH2 by diode D51 and resistor R62 cuts off transistor AFH2 and momentarily opens the collector circuit thereof. Thus, the signal OFHA is an interrupted ground potential signal which is synchronized with the signal OFH as described.

The control for the two position counters also includes a plurality of flip flop gates which form part of the distributor gate system. A typical flip flop gate is illustrated in FIG. 11 which here shows the gate which gates the information from row 15 (Rw15) of the tape into the thousands level flip flop of the Z position counter ZPC. Here, again, a particular tape row is defined by a combination of two signals from the tape row counter TRC, row 15 being defined by the signal combination QC and Q3. These two signals are applied as AND circuit inputs on a pair of gating diodes D53 and D54, respectively, the outputs of which are commonly distributed through the gating network indicated. This distribution is effected by respective diodes D55, D57, D59 and D61 forming one of two diodes in respective AND gates including respective diodes D56, D58, D60 and D62. Each of the AND gates is provided with pull down resistors which are respectively designated R65, R66, R67 and R68 which are connected to −25 volts. The E voltage signal circuits E1C, E2C, E3C and E4C (FIG. 5a), utilized in setting the flip flops, are respectively coupled to the AND gate diodes D56, D58, D60 and D62 to complete the inputs for this particular circuit. The corresponding gating signals are designated E1, E2, E3 and E4 and like the "A" signals previously described are two level voltages swinging between −2 volts and zero volts each time a hole in the tape is read. The outputs of the respective AND gates are indicated as applied to the $K_n$ input terminals of the respective flip flops FQz13 through FQz16 of the thousands level of the Z position counter.

As earlier noted herein, the presence of a hole in the tape is ineffective to trigger a counter flip flop which is set in the "1" representing electrical state prior to the introduction of the information from the tape. The absence of a hole in the tape, however, results in a positive going voltage pulse at the output of the associated AND gate to provide a triggering voltage on the K side of the flip flop, switching the flip flop from its "1" representing electrical state to its "0" representing electrical state. This operation takes place as follows, reference also being made to the circuits associated with the "E" signal circuits E1C, E2C, E3C and E4C in FIG. 5a. Assuming, for instance, that row 15 of the tape is being read, the signals QC and Q3 will be in the lower of their two voltage states, the respective flip flops FQc and FQ3 being set in their "1" representing electrical states. Thus, the output of the gate including the diode D53 and D54 is low. This low voltage is coupled through the respective gating diodes D55, D57, D59 and D 61. Thus, one terminal of each of the AND gates is at the lower of its two voltage states. If one of the "E" signals is present on an input terminal of one of the AND gates a triggering pulse is prevented from being formed at the associated $K_n$ terminal of the asociated flip flop. Assuming, for instance, as shown, a hole exists in column 3 of the tape in the row 15 position. This results in the generation of the signal E3 which swings from −2 volts to ground potential. This signal is coupled to the cathode of the diode D7. The anode of diode D7 now tends to rise to ground potential as a result of the connection provided by the resistor R7 to +25 volts (FIG. 5a). This rising voltage is coupled by the resistor R7 and capacitor C1a to the base of transistor Qf1. The resistor R7 limits the charging current and as a consequence results in a ramp type voltage rise which is coupled to the base of transistor Qf1 (see FIG. 6). This voltage ramp does not have the switching characteristic of the positive going pulse type of voltage which is required for triggering the conducting transistor Qf1 to nonconducting condition. As a consequence, the transistor remains conducting and the flip flop remains in its "1" representing electrical state with transistor Qf1 conducting and transistor Qf2 off and the output terminal Q in its "1" representing electrical state, that is, at −2 volts.

Assume now that no signal had been programed. In this respect refer to column 4 where the 8 weighted bit is absent. A signal E4 is therefore not produced. In this situation no coupling through the circuit E4C into the gate takes place. The input to the gate remains low until such time as the flip flop FQ3 of the tape row counter switches from its "1" representing electrical state to its "0" representing electrical state. The positive going trailing edge excursion of the signal Q3 is now coupled directly into the terminal $K_n$ of flip flop FQz16 and the sharp positive going pulse resulting therefrom is effective to cut off the conducting transistor Q$f$1 in order to switch the flip flop from its "1" representing electrical state to its "0" electrical state. Thus, for the dimension programed on the tape the presence of signal E3 results in the flip flop FQ$z$15 remaining in its "1" representing electrical state whereas the absence of a hole in the tape and the lack of signals E1, E2 and E4 results in switching of the flip flops FQ$z$13, FQ$z$14, and FQ$z$16. Thus, reading from least significant to most significant, left to right, the flip flop configuration is 0010 and the actual decimal number represented thereby is 4. A gate of this type is provided for each row of information on the tape and is utilized for the purpose of setting flip flops.

In the discussions hereinabove reference has been made to various types of voltages. FIG. 12 is a timing diagram or chart showing the relationships of these voltages and their general idealized configuration. In this illustration a rectangular voltage E7–0 is arbitrarily depicted in the upper left of the drawing. It is properly positioned in row 0 and represents the start code signal which is read in row 0, column 7, of the tape. This timing diagram begins with row 0 and then jumps to row 14, continuing consecutively with rows 14 through 20 which covers all of the rows of information for the Z counter and the F counter, and then jumps to row 28 which is the select zero row of the tape. The signal in row 15 of the tape is designated E3–15 and represents the signal of column 3. In row 16, the two signals are designated E2–16 and E3–16 representing the signals of columns 2 and 3. These are the signals that inhibit switching of flip flops FQ$z$15, F$Q z$10 and FQ$z$11 causing the Z position counter ZPC to indicate a programed distance of 4.6 inches. In row 19 of the tape the signal E2–19 is indicated. This is derived from the mark in column 2, row 19, of the tape. In row 20 the signal E–20 denotes the signal derived from the mark in column 3, row 20, of the tape. These signals inhibit switching of flip flops in the F counter FPC resulting in an F counter setting representing 2.4 inches. The signals in rows 19 and 20, as indicated from the tape format, are coupled to the F counter FPC, via a gate of the type of FIG. 11, when the counter configuration is $Qd.Q$1 for row 19 and $Qd.Q$2 for row 20.

Signals A1–28 and A3–28 denote the "A" signals for the example herein chosen, that are utilized to select the zero lamp on the machine tool. These signals, as will be seen from the tape, denote the decimal number 5 and are applied to gates of the general type illustrated in FIG. 9 in which a relay having a coil coupled between a collector of transistor A20 and ground would be energized with the occurrence of the signal A1. Such relays, as will be described hereinafter, are conventional latching relays which pick up and latch to hold their energized positions independently of input from the energizing source, which is necessary in this situation. A second, similar relay for this particular gate would have a coil coupled between ground and the collector of transistor A22 to be energized and latched in energized position with the occurrence of a signal A3. Thus, the signals A1 and A3 of row 28 are instrumental in setting selected relays or groups of relays connected between collector circuits and ground, as described in connnection with FIG. 9, to initiate control signals applicable in suitable lamp circuits, yet to be described in detail, for selecting particular ones of the lamps for zero reference purposes.

The feed hole signals OFH and OFHA are also depicted in FIG. 12, indicating the interruption of the signal OFHA at such times as the feed hole signal OFH is in the lower of its two voltage states. The voltage configurations of the flip flops of the tape row counter for the tape rows shown are indicated in the lower portion of this figure. The relationship of the switching of the flip flops Q0 through Q5 to the feed hole signals is shown in FIG. 12. For instance, with reference to the flip flop Q0, it is switched from its "1" representing electrical state, which occurs just subsequent to the center line of the row 17 position, to its "0" representing electrical state, by the positive going excursion of the feed hole signal at row 18. Likewise, this positive going excursion of the Q0 signal just subsequent to the centerline of the row 18 position, is instrumental in switching the flip flops FQ1 to its "1" representing electrical state, as indicated. It will be seen also that the flip flop FQ5 has a positive going excursion of its signal Q5 just beyond the centerline of row 17 which switches the flip flop FQ0 to its "1" representing electrical state as indicated.

The final aspect of position counter control is under the control of the count gates CG which are shown in detail in FIGS. 13 and 14. The count gate of FIG. 13 is enabled by the signal Q$dz$ when the machine spindle assembly is to be moved upwardly. The signal Q$rz$ is applied along with the signal Q$dz$ to the respective input diodes D10$a$ and D10$b$ of an AND gate, the cathodes of which are commonly coupled by a pull down resistor R10 to $-25$ volts. The output of this AND gate is coupled through a diode D11 to an output circuit, including a pull up resistor R11 connected to $+25$ volts, and a diode D12 to which the count pulses N$_p$ are applied. The output circuit of this count gate is represented in the twin outputs J$_p$ and K$_p$ which, as indicated in FIG. 8, are the J and K input terminals of the least significant flip flop FQ$z$1 of the Z position counter. The gate illustrated in FIG. 14 is similar and gates the signals $\overline{Q}dz$ and O$rz$ by means of respective diodes D13$a$ and D13$b$ of an AND gate having a pull down resistor. R13 commonly connecting the cathodes of the diodes to $-25$ volts. The output of this gate is connected to the cathode of a coupling diode D14, the anode of which constitutes the output circuit and is coupled to the cathode of an input diode D15 to which the pulses P$_p$ are applied during downward movement, and coupled to a pull up resistor R14 the other terminal of which is connected to a supply of $+25$ volts. The output circuits are designated K$_n$ and J$_n$ and as seen in FIG. 8 are applied to the appropriate J and K input terminals of the least significant flip flop FQ$z$1 of the Z position counter. With reference to both of the gates in FIGS. 13 and 14, at any time that one of the two input signals is at the higher of its two potentials the output terminals of the gate will be correspondingly clamped. This clamping voltage is roughly ground potential. Consequently, the pulses P$_p$ and N$_p$ which swing from some negative voltage ($-2$ volts) towards ground potential, do not produce a positive going output pulse in the output of the gate. Thus, counting is inhibited at any time that one of the two input signals on either of the gates is at the higher (ground) of its two voltage levels.

*Z zero gate*

The details of the Z zero gate ZZG are illustrated in FIG. 15. This is a conventional AND gate the output of which drives an inverter amplifier. The AND gate comprises a plurality of parallel connected gating diodes designated DZ1 through DZ18, the common cathodes of which are connected through a pull down resistor RZ16 to $-25$ volts. As indicated, the signals $\overline{Q}z$1 through $\overline{Q}z$18 are applied as inputs to the respective diodes. When all of the counter flip flops are in their "0" representing electrical state all of the gate input signals will be low and the output of the gate will be in the lower of its two voltage levels, in this case approximately $-2$ volts. The output of the gate is coupled by a diode DZ19 to the base of a transistor QZ0. Base bias for this transistor is provided by means of a voltage divider including the series connected resistors RZ1 and RZ2 connected between $+25$ volts and $-25$ volts. These resistors are selected of such value that the base of the transistor is normally biased positive thereby and the transistor is normally nonconducting. The emitter of this transistor is connected to $-25$ volts through a resistor RZ4 and to ground through a silicon diode DZ21 employed to introduce a small forward voltage drop which pulls the emitter below the normal base bias so that the transistor may be cut off. The transistor collector and an output diode DZ20 are coupled to opposite sides of a resistor RZ5 forming part of a voltage divider network including resistors RZ3 and RZ6 in series between +25 volts and −25 volts. The values of the resistors are such that the output voltage at the cathode of diode DZ20 is normally at some negative voltage. At such time as the output of the AND gate is low, indicating a count of zero for the Z counter, the transistor QZ0 is biased to conduction. This couples the bottom side of the resistor RZ5 of the voltage divider to approximately ground potential and correspondingly raises the upper end thereof which is connected to the diode DZ20. As a consequence, the output of the diode now swings from, say −2 volts to some voltage above ground potential, depending upon the IR drop across the resistor RZ5, to provide a sharp positive going voltage at the $K_n$ input terminal of the flip flop, $FQmz$. It will be recalled the flip flop $FQmz$ is initially set in its "1" representing electrical state by the setting control provided by the Z counter setting relay KSZ. The application of this positive going voltage to the $K_n$ input terminal thus switches the flip flop $FQmz$ from its "1" representing electrical state, to indicate that the bottom or limit of the programmed movement in the Z or feed axis has been reached. The control functions resulting from this switching of the flip flop have been previously described.

Z move amplifier

FIG. 16 illustrates the details of the Z move amplifier which includes the amplifiers A9 and A10 and the control circuits associated therewith. The input to this circuit is represented in an AND gate AG1 and input diodes D35, D36 and D37, the common cathodes of which are coupled through a pull down resistor R35 to −25 volts. The output of this AND gate is coupled through a resistor R36 to the base of a grounded emitter transistor $Qa9$ forming part of amplifier A9. The collector of this transistor is coupled through resistor R38 to −25 volts. The base circuit of the transistor $Qa9$ is coupled through a resistor R37 to +25 volts. The circuit from +25 volts to −25 volts, including the resistors R37, R36 and R35, in effect, is a voltage divide circuit controlling the base voltage of the transistor $Qa9$. The signals controlling the AND gate are the move flip flop signal $Qmz$ and two signals $\overline{A}mx$ and $\overline{A}my$, which last two signals as described indicate the movements in two other axes of the machine tool system have been completed. It will be appreciated that other "operations pending" signals may be incorporated in this gate for the purpose of inhibiting Z move amplifier operation until such time as the operations indicated thereby have been completed.

The output of the amplifier A9, represented in its collector circuit, is coupled to one input terminal T0 of the AND gate AG2 and produces a signal $Amz$ which is at ground potential when the amplifier A9 is conducting, indicating in this, the higher of its two voltage levels, that movement in the Z or, in this case, the feed axis may take place. Amplifier A10 comprises a transistor $Qa10$ having a grounded emitter. The collector terminal is denoted $Gmz$ which as seen in FIG. 5b, is coupled as an input to the gate AG3. The signal $Gmz$ is at ground potential when the transistor $Qa10$ is conducting and is used as an inhibiting signal to prevent movement in the Z axis until all auxiliary functions are performed in the system.

To this end the transistor $Qa10$ is controlled by the AND gate AG2 having a plurality of input terminals T0, T1 and T2 for controlling the gate. Terminal T0 is in one parallel branch of this gate from resistor R39 to −25 volts, including resistors R40 and R38. Terminal T1 is in a second branch including resistors R41 and R42 and terminal T3 is in a third branch including resistors R42 and R44. The division of voltages between +25 volts and −25 volts provided by resistor R39 and the other resistors of the parallel branches of the gate AG2, in the absence of input biases on any one of the terminals T0, T1 and T2, will normally be such as to drive the base negative and cause conduction which couples the collector of the transistor $Qa10$ to ground.

One auxiliary function signal is the down inhibit signal coupled to terminal T1. In the normal mode of operation this signal is at ground potential and operates as a gate enabling control. However, in the select zero mode, the down inhibit signal circuit is open circuited until a lamp selection is completed, at which time it is again grounded. Other auxiliary function signals may include a signal indicating the tape row counter is still counting, a signal indicating a block of tape is being read, a signal indicating a parity error, etc., which may be coupled to a terminal T2, etc., by extending the gate. In the interest of simplicity facilities for producing such auxiliary function signals are not shown and the gate terminal T2 is shown grounded.

Whenever all input signals on gate AG2 are at ground potential, transistor $Qa10$ is cut off which open circuits its collector circuit removing the inhibiting signal $Gmz$ from the input to gate AG3. If the signal $\overline{Q}dz$ is in the lower of its two voltage states, removal of inhibiting signal $Gmz$ results in a drop in output of gate AG3. causing transistor $Qa11$ of amplifier A11 to conduct and grounding the collector circuit. As described, this completes the energizing circuit for relay $Kmpz$.

Comparator

A typical comparator circuit ZFC is illustrated in FIG. 17. Here, respective pairs of AND gates compare the Q and $\overline{Q}$ outputs of the F counter flip flops with the $\overline{Q}$, Q outputs respectively, of the Z counter flip flops in the counter levels indicated. The diodes of AND gate AG23 couple the $\overline{Q}$ output of flip flop $FQz16$ and the Q output of the flip flop $FQf8$. The diodes of AND gate AG22 couple the Q output of flip flop $FQz16$ with the $\overline{Q}$ output of the flip flop $FQf8$. These gating circuits ranging from AND gate AG8 through AND gate AG23 correspondingly couple the outputs, as just described, of all of the flip flops $FQz9$ through $FQz16$ of the hundreds and thousands level of the Z position counter with the flip flops $FQf1$ through $FQf8$ of the F position counter. The outputs of all of these AND gates are coupled by respective diodes to an OR gate OG8, the output of which in turn is coupled through a diode to the base of a transistor $QaR$ forming part of an amplifier AR. The emitter of this transistor is grounded and the collector is connected to −25 volts through a resistor R51. The base of this transistor is also coupled to +25 volts through a resistor R50. This transistor is biased so that it is normally conducting, in which case the collector circuit which is coupled to the latching coil L of rate relay $Kcpa$ is at ground potential. Since the other side of this coil is grounded (see FIG. 5a) the rate relay is normally de-energized. As long as at least one pair of the dissimilar pairs of signals on the input to one of the AND gates exist in the lower of its two voltage states, this indicates that there is not equality between the contents of the two counters and results in a low output of that particular AND gate which by the coupling afforded by the OR gate OG8 maintains the low base voltage required for conduction of transistor $QaR$. At such time as none of the indicated signal relationships exists, which indicates equality of count between the two counters, all of the OR gate terminals are at the higher of their two potentials, that is, approximately at ground potential. As a consequence, the base voltage of the transistor $QaR$ is raised and conduction is cut off. This decouples the collector circuit from ground and the circuit for the latching coil of the rate relay is now completed from −25 volts through the collector circuit resistor R51 through the coil L of the latching relay to ground.

Pulse generator

The pulse generator referred to in describing FIGS. 5a and 5b, as noted, is described in a copending application of M. R. McElroy, Serial No. 850,436, identified hereinabove. Only such portions of this equipment as are essential to an understanding of this invention will be referred to particularly herein. For additional details reference may be made to the aforesaid copending application.

The pulse generator circuit includes signal forming circuits of the type typically represented in FIG. 18. One such circuit is included for each transducer which is utilized. In the present system there are three transducers. One is the transducer head HMz1, a second is the transducer head HMz2 and the third is the zero photodiode PD0. Each magnetic head utilizes a circuit of the type indicated in FIG. 18. The zero photodiode utilizes a modification thereof, as indicated in FIG. 19.

The circuit of FIG. 18 comprises a two-stage amplifier including transistor Qp1 and Qp2 connected in cascade which are utilized to drive a trigger circuit comprising transistors Qt1 and Qt2. The output of this trigger circuit directly produces a signal M1 which is differentiated to produce a signal $d(M1)$. An inverter amplifier Qp3 which is driven by signal M1 produces an inverted signal $\overline{M1}$ which in turn, is differentiated to produce a signal $d(\overline{M1})$.

In detail this circuit includes an input device in a transducer system TD1 including the magnetic head Hmz1. Patents 2,897,462, 2,902,765 and 2,918,662 show various transducer circuits employing magnetic heads and having output circuits which may be coupled into the circuit of FIG. 18. For the purpose of this discussion it will be assumed that in circuit TD1 the magnetic head HMz1 modulates a one megacycle signal which is filtered, clipped and squared and coupled between a tap of a potentiometer P1 and ground in a circuit including a calibrating resistor CR1. The potentiometer P1 is coupled between +25 volts and ground. The terminal of resistor CR1 which is connected to the transducer TD1 is also coupled to the base of an NPN transistor Qp1. When the magnetic head is not over a groove on the scale it is in the higher of its two impedance states and the output voltage is at the higher of its two levels. The resulting base bias drives the transistor Qp1 to conduction. This couples the collector circuit of this transistor to ground. The base circuit of the transistor Qp2 is coupled to the collector circuit of the transistor Qp1 through a resistor R16 and is also coupled to —25 volts through a resistor R17. The voltage division with resistor R16 coupled to ground, results in the application of negative potential to the base of transistor Qp2 driving this transistor to conduction. The collector of transistor Qp2 is connected directly to —2 volts, as indicted, and the emitter circuit is coupled through a diode D16 to the base of transistor Qt1 applying approximately —2 volts thereto and causing conduction.

The transistors of the transistor trigger circuit are connected in common emitter configuration. A resistor R20 of low ohmic value connects the common emitter circuit to ground. A resistor R19 connects this emitter circuit to +25 volts. The base of transistor Qt2 is connected in a voltage divider circuit including resistors R21, R22 and R23 in series between +25 volts and —25 volts. The base bias of transistor Qt2 provided by this circuit is such as to cause this transistor to conduct, in the absence of the application of approximately ground potential between resistors R22 and R23 by the collector of transistor Qt1 when it is conducting. The collector of transistor Qt2 is coupled to —25 volts through a resistor R26 and through a diode D17 and resistor R25 to +25 volts. Resistor R18 connects the anode of diode D16 to +25 volts and resistor R24 connects the cathode of diode D16 to —25 volts. The resistor R24 is the larger of the two providing a normally positive bias on the base of transistor Qt1 in the absence of conduction of transistor Qp2. The collector circuit of the transistor Qt2 is further connected to —2 volts through a clamping diode D18.

The circuit condition described to this point denotes operation of the circuit when the head Hmz1 is in the higher of its two impedance states and consequently at the higher of its two voltage levels, that is, in a position over a land on the scale S. When the head moves over a groove and the magnetic circuit reluctance drops the head voltage drops correspondingly and the base of the transistor Qp1 is moved towards ground potential which cuts off the transistor. This action cuts off transistor Qp2 which in turn cuts off transistor Qt1 of the trigger. The triggering action switches on transistor Qt2 so that the collector circuit switches from —2 volts toward ground.

The collector circuit of transistor Qt2 is coupled to a differentiating circuit, including a capacitor C10, through a diode D19, the output of this circuit being the signal $d(M1)$, as earlier described. A clamping diode connects the output of the differentiating circuit to ground. A resistor R28 connects the collector circuit of transistor Qt2 to the base of a transistor Qp3 which functions as an inverter amplifier. The emitter of this latter transistor is grounded and the collector circuit is clamped to —2 volts by means of a diode D23 in a circuit including resistor R29 which is connected to —25 volts. The output of the collector circuit is the signal $\overline{M1}$. This collector circuit is coupled to a differentiating circuit, including a capacitor C11, by means of a diode D21. The output of the differentiating circuit is grounded through a ground clamp diode D22. The output signal is $d(\overline{M1})$.

As noted earlier herein, two such circuits are employed, one for each magnetic head. Since the head voltages are out of phase with one another the respective transistor voltages and differentiated transistor voltages will also be out of phase. As described in the copending application of M. R. McElroy, aforesaid, these are combined in a particular logical relationship to produce a series of pulses $P_p$ representing relative movement in one direction between the head and scale and, $N_p$, representing relative movement between the head and scale in the opposite direction.

This same circuit, modified as shown in FIG. 19 and substituting the photodiode PD0 for the head HMz1 in FIG. 18, is utilized to produce the signal $\overline{ML}$ described in connection with FIGS. 5a and 5b. The substitution of the photodiode for the magnetic head involves no different function than previously described. In this instance the photodiode is connected between the terminal of resistor CR1 and ground, its cathode being grounded. When the photodiode is dark it is at the higher of its two voltage levels and when light is at the lower. Thus, when it is dark, transistor Qt1 is conducting and the transistor Qt2 is cut off. The collector of the transistor Qt2 is at the lower of its two voltage states. This signal in FIG. 19 is represented as the signal ML and is inverted by the transistor Qp3, as described in connection with FIG. 18, to produce the signal $\overline{ML}$. Thus, when the photodiode is dark the signal $\overline{ML}$ is at the higher of its two voltage levels, in this case ground potential, and when the photodiode is light, the signal $\overline{ML}$ is at the lower of its two voltage levels.

As will be seen in FIG. 19 and in FIG. 20a, the selective zero trigger output signal Tr is coupled to the $J_p$ input terminal of the flip flop FQlz and is instrumental, in the absence of the signal Tr Inhibit, in switching this flip flop to its "1" representing electrical state whenever the signal $\overline{ML}$ is switched from the lower of its two voltage states to the higher. This is the positive trailing edge of the signal Tr. To prevent unwanted triggering of the flip flop FQlz, a gating circuit has been added which is controlled by contacts K59B of a relay K59, yet to be described. The contacts K59B when closed connect the input resistor R30 of this gating circuit to ground potential, thereby raising the input to the gate. The gating circuit includes a clamping diode D30 which is connected to −2 volts. The cathode of this diode is connected to the output side of the resistor R30. The output side of the resistor R30 is also connected to a coupling diode D30 the cathode of which is coupled to the cathode of a second diode D32. The common cathode circuit of diode D31 and D32 is connected to −25 volts through a resistor R31. The anode of the diode D32 is connected through a coupling resistor R32 to +25 volts. The anode of diode D32 is also connected to the input terminal $J_p$ of the flip flop FQ$lz$. The signal $\overline{ML}$ is coupled through a diode D33 to the terminal $J_p$ of the limit flip flop FQ$lz$ and is poled in a sense to couple the positive going trailing edge of the $\overline{ML}$ signal to the input terminal $J_p$ whereby the signal T$r$ is produced.

When the contacts K59B are closed, the terminal $J_p$ of the limit flip flop FQ$lz$ is maintained at substantially ground potential. Thus, during the period of time that the contacts K59B are closed, the occurrence of the $\overline{ML}$ signal is ineffective to trigger the flip flop. Whenever the contacts K59B are open the diode clamp D30 maintains the terminal $J_p$ at approximately −2 volts.

FIG. 19a shows the relationship of the signals $\overline{ML}$, T$r$ and T$r$ Inhibit.

FIGS. 20a and 20b illustrate the details of the select zero circuits. This showing combines the details of the zero switches ZS, the lamp circuits LC1 through LC9, the zero trigger circuit ZT and the count control circuit CC.

As illustrated, the zero switches comprise respective relays K51 through K54, each of which has a normally closed contact and a normally open contact. These relays, as indicated generally in FIG. 5a, are energized by relay gates of the type typically illustrated in FIG. 9, but lacking the circuit of the transistor amplifier A24. The convention which is adopted here is that the presence of a hole in the tape operates to energize a particular relay. The respective latching coils of the relays are connected in series with the collector circuits of the respective transistors A20 through A23, which circuit includes additionally a resistor connecting the coil circuit to −25 volts. Hence, at such time as conducting base bias exists on a selected transistor the swing of the input voltage on the emitter circuit to ground potential results in transistor conduction and the momentary completion of an energizing circuit for the selected coil. Since all of these relays are of the latching type this momentary energization results in the relays being picked up and held in their energized position. With reference to FIG. 2 row 28, holes are indicated in columns 1 and 3. The tape row counter TRC is in the configuration $Qe.Q4$ at this particular time (see FIG. 12). The perforations in the tape result in the generation of signals A1 and A3 which rise to ground potential during the period of time that the signals $Qe.Q4$ are true. As a consequence, relays K51 and K53 are energized closing their contacts K51M and K53M, respectively.

At the time of this operation the up relay K$mnz$ is de-energized and consequently the contacts K$mnz$5 are closed. This couples +25 volts into each of the lamp circuits LC1 through LC9. This voltage, as indicated with respect to lamp circuit LC5, which is detailed and which is typical of the other lamp circuits, is connected as input to a pull up resistor R70 for the gate. The gate additionally includes the input diodes D70 through D73 which, as indicated here, are connected respectively to the contacts K51B, K52M, K53B and K54M. This denotes the binary number 1010 (least significant bit in the left), the "B" contacts representing "1" and the "M" contacts representing "0." Each of the contacts of the information relays K51 through K54 is connected to −2 volts. Thus, the contacts K51B and K53B normally bias the cathodes of the diodes D70 and D72 to −2 volts which holds the output of the gate circuit at −2 volts. Selection of the lamp associated with this gate takes place whenever the relays K51 and K53 are energized which opens the contacts K51B and K53B. This open-circuits all of the gate diode cathode circuits.

This gate circuit includes an output diode D75, the cathode of which is connected through a resistor R71 to −25 volts, as indicated. The resistor R71 is of such value that the cathode of diode D75 is driven to a positive potential in the absence of a −2 volt clamping voltage on the cathodes of any of the gate diodes. Hence, at such time as the negative inputs to the gate are removed the cathode of the diode D75 swings abruptly positive. This positive going voltage is utilized to light the lamp which is associated with that particular gate, as will be described at a later point.

Whenever select zero is programed, provision is made for disabling the limit switch function in initiating count down of the counter. This is accomplished by means of a relay K55, the latching coil of which is coupled through respective diodes to each of the input circuits of the latching coils of the respective information relays K51 through K54. Hence, at this time the energizing circuit for any one of these relays is completed, the relay K55 is energized and latched in energized position. In energized position the contacts K55M are closed completing a circuit from ground through the latching coil of a relay K56 and a calibrating resistor to −25 volts. Relay K56 is now energized and latched in energized position. In energized position contacts K56M are closed and K56B are open. These contacts are used to generate the inhibit signals and apply power to the lamps.

The inhibit signal is produced by a transistor A30 connected as an emitter follower. The collector circuit of this transistor is connected to −2 volts. One branch of the emitter circuit is coupled to the outputs of all of the gates of the lamp circuits LC1–LC9 through diodes such as the diode D74 of circuit LC5. These diode circuits operate to clamp the outputs of the gates at about −2 volts whenever transistor A30 conducts which occurs after a lamp has been selected and lit, and thereby prevent accidental triggering of other gates and lighting of other lamps after a lamp selection is made. Another branch of the emitter circuit is coupled to the cathode of an input diode of the AND gate AG5 which is used to control the limit flip flop FQ1$z$. This emitter circuit produces the inhibit signal IS.

Prior to the time that the relay K56 is energized, the output of a voltage divider including a Zener diode ZD3 and a resistor R72 in series between +25 volts and ground is coupled through the normally closed contacts K56B and a second Zener diode ZD2 to the base of transistor A30. In one practical embodiment the Zener diode ZD3 provides about a 12 volt voltage drop and the diode ZD2 about a 6 volt voltage drop. The net result is about a 7 volt positive voltage on the base of the transistor A30, which is coupled to the emitter. The inhibit signal is therefore approximately of the order of 7 volts positive and is coupled to the input diode D81 in the gate circuit AG5.

At the time relay K55 is energized relay K56 is energized and latches in. The circuit through the contact K56B now opens and that through the contacts K56M, including resistor R73, now closes. At the same time, as a result of closing of contacts K51B and K53B, the gate for lamp circuit LC5 has become true. The positive going voltage at the cathode of diode D75 is coupled to the cathode of a controlled rectifier D76, driving this rectifier to conduction. Once conducting, the rectifier D76 remains conductive. Controlled rectifier D76 when conducting couples one side of the lamp L5 to ground, as indicated. The other side of lamp L5 is connected through resistor R73 and the now closed contacts K56M to the voltage divider network, including resistor R72 and Zener diode ZD3. The approximate 12 volt voltage at this voltage divider energizes the lamp and additionally is now coupled through a diode D77 to the input of Zener diode ZD2. As earlier mentioned, this diode has about a 6 volt voltage drop thereacross. The lamp L5 and controlled rectifier D76 together have a combined voltage drop of 3 volts or less. The anode of diode D77 is therefore approximately 3 volts above ground. Thus, the Zener diode ZD2 has a cathode potential of about 3 volts above ground and a 6 volt voltage drop thereacross in a negative direction through the resistor R74 to −25 volts. The base of transistor A30 is therefore biased negative and the emitter of A30 is at −2 volts. The inhibit signal IS therefore swings to −2 volts disabling all of the lamp selection gate circuits and lowering the cathode bias of diode D81 of gate AG5 to −2 volts.

This entire lamp selection operation has taken place with the machine tool in its upper limit, contacts LSM are closed and the relays K$fd$ and K$fc$ are energized. Contacts K$fd$M are therefore closed.

The gating circuit AG5 comprises a pair of input diodes D81 and D82, the anodes of which are commonly connected to a pull up resistor R76 connected to +25 volts. The clamping diode D83 clamps the cathode of diode D82 to −2 volts. Resistor R77 connects the contacts K$fd$M to the cathode of diode D82. This cathode circuit additionally includes the common terminal of a voltage divider circuit including series connected resistors R80 and R81 connected between +25 volts and ground. As the machine tool spindle moves out of its upper limit, limit switch contacts LSM open dropping relay K$fd$. Contacts K$fd$M open and K$fd$B close. When contacts K$fd$B close the terminal $K_s$ swings negative which has no effect on the flip-flop. When contacts K$fd$M open a positive going voltage on the terminal $J_n$ is inhibited since the cathode of diode D81 is now clamped at −2 volts through the transistor A30. Consequently, no effect on the limit flip-flop FQ$lz$ takes place and the flip-flop remains in its $\bar{Q}$ electrical state as initially set by the signal $K_s$.

At the time the photodiode PD0 is illuminated by the lamp L5 the signal $\overline{ML}$ swings negative (see the description of FIGS. 18 and 19). This negative going signal at this time has no effect on transistor A32 since the emitter circuit of this transistor is open circuited by the up relay contacts K$mnz$2. This negative going excursion is coupled to the base of a transistor A34 the emitter of which is presently grounded by contacts K$mpz$3 of the move positive or down relay. Transistor A34 conducts completing an energizing circuit for the coil of a relay K59 between ground and −25 volts, as indicated. The contacts K59B of this relay now open removing ground potential (Tr Inhibit) from the input circuit $J_p$ of the limit flip flop FQ$lz$ and the trigger voltage Tr swings negative (see FIG. 19a).

As the photodiode PD0 passes the energized lamp and goes dark again, the signal $\overline{ML}$ switches from about −2 volts toward ground potential. This positive going excursion of the signal $\overline{ML}$, in the absence of the clamping voltage, Tr Inhibit, causes the trigger signal Tr to swing in a positive direction toward ground which triggers the limit flip flop KQ$lz$ to its "1" representing electrical state. Thereafter, the contacts K59B close to again inhibit this input circuit. As earlier described, the flip flop FQ$rz$ is now switched to its "1" representing electrical state and count down operation of the Z counter under the control of pulses $P_p$ takes place.

At zero count of the Z position counter ZPC the relay K$mpz$ drops out and the relay K$mnz$ is energized, as described, which results in retract or upward movement of the machine spindle. Contacts K$mpz$3 in the coil circuit of the relay K59 are now open and contacts K$mnz$2 now close and ground the collector circuit of transistor A32 in the coil circuit of the first upper simulator relay K57. As upward movement continues the photodiode PD0 is again illuminated by the lamp which generates the signal $\overline{ML}$. The negative going excursion of the signal $\overline{ML}$ applies a negative bias to the base of transistor A32. This transistor now conducts connecting the latching coil L of the upper simulator relay K57 between ground and −25 volts, as indicated, and this relay is energized and latched in energized position. Contacts K57B now open removing the −2 volt bias from a diode D79 forming part of a gating circuit with diode D78 and pull up resistor R78 for the emitter of transistor A33 which is connected as a grounded base amplifier. The collector of transistor A33 is connected to one terminal of the latching coil of a second upper simulator relay K58, the other terminal of which is connected through a resistor to −25 volts. When the $\overline{ML}$ signal again swings in a positive direction transistor A32 is cut off and the voltage on the cathode of diode D78 is approximately zero volts. Although transistor A32 is cut off relay K57 remains latched. Since diode D79 is unbiased the gate is enabled and the emitter potential rises to approximately 0.5 volt on transistor A33. Transistor A33 now conducts and energizes the latching coil of relay K58 which closes in contacts K58M. Contacts K58M complete an energizing circuit for the feed relay K$fd$ which now picks up and closes its contacts K$fd$M while opening its contacts K$fd$B. Removal of the pull down bias through contacts K$fd$B results in a positive going pulse on the terminal $K_s$ of the limit flip flop FQ$lz$ which switches this flip flop to its "0" representing electrical state. By reference to FIGS. 5a and 5b it will be seen that either the signal $\overline{Qmz}$ or $\overline{F}$, depending upon whether or not fast retract or feed rate retract had been programed, will have turned off the flip flop FQ$rz$. The operation provided by the move and directional flip flops FQ$mz$ and FQ$dz$ now initiates a second cycle of operation energizing relay K$mpz$ and dropping relay K$mnz$. Operation of amplifier A11 (signal A$mpz$) also completes an energizing circuit for the unlatching coils of both of the upper simulator relays K57 and K58. The contacts K58M now de-energize the feed relays K$fd$ and K$fc$ and the cycle is repeated, as earlier described.

During retract or upward movement, relay K57 maintains a gate disabling bias on diode D79 until the lighted select zero lamp is sensed. This delays stop during retract, in conjunction with the delay afforded by relay K58, until the photodiode goes past the lighted lamp. The contacts K59B ground the trigger circuit during retract and prevent generation of the signal Tr even though the signal $\overline{ML}$ exists.

The relay K55 switches the control between normal count down operation from the zero point on the scale S to count down operation under the control of the select zero circuits. When select zero is programed realy K55 is energized, as eariler described. Thus, the ground connection provided by contacts K55B which ground the down inhibit circuit DIC is removd and the down inhibit circuit is effectively open circuited thereby. A transistor A31 having a grounded emitter has a collector circuit connected to the down inhibit circuit. This transistor is controlled by the same circuit that controls the inhibit transistor A30 and therefore is controlled at such time as a lamp is selected and energized. Prior to energizing of the lamp the transistor A31 is nonconducting. Thus, the down inhibit circuit DIC is at open circuit potential. By reference to FIG. 16, it will be seen that the terminal T1 now does not have a voltage applied thereto. Consequently, the voltage division through the resistor circuit coupled to the base of transistor Q$a$10 between +25 volts and −25 volts, results in conduction of this transistor coupling its collector circuit to ground. This inhibits the gate AG3 and prevents operation of the amplifier A11. Thus, the down relay K$mpz$ remains de-energized. When the selected lamp is energized, the biasing potential coupled to the base of the transistor A30 causing it to conduct, is coupled through a delay network including a resistor R75 and a capacitor, having one terminal connected to −2 volts and the other to the base of transistor A31. After a delay sufficient to insure full lighting of the selected lamp, the base voltage drops sufficiently to cause conduction of transistor A31 effectively grounding its collector circuit and applying approximately ground voltage to the terminal T1 of gate AG2. The remaining rise in base voltage cuts off transistor Q$a$10 and the inhibiting signal G$mz$ is removed from gate AG3. Amplifier A11 now conducts and relay K$mpz$ picks up permitting positive or downward movement of the machine spindle assembly. This circuit also prevents downward movement of the machine spindle in the select zero mode of operation if a selected lamp is open circuited for any reason. In this situation the lamp control voltage in the base circuit of the transistors A30 and A31 fails and the transistors are not biased to conduction. Consequently, amplifier A11 remains conducting and the signal G$mz$ inhibits gate AG2.

If a selective zero function had not been programed, there would be no signals A1 through A4 in the inputs to the information relays K51 through K54. Relay K55 therefore remains de-energized and its contacts K55B apply ground potential to the down inhibit circuit. Consequently, relay K$mpz$ may be energized.

FIG. 10 of application Serial No. 184,204 of E. J. Toscano, identified hereinabove, illustrates an arrangement for automatically starting and stopping the tape reader. Whenever all operations programed by a particular block of tape have been completed, that is, there are no operations pending, the tape reader is automatically restarted and a new block of information is read. Assume now that a "selective zero" function is not programed in the new block.

If the preceding block had programed "select zero," at this point the spindle assembly will have been retracted to a point just above the lighted select zero lamp. As the new block of tape moves through the tape reader, the start code marker switches the output circuit S$c$C of amplifier A8 to ground. Grounding of circuit S$c$C completes an energizing circuit for the unlatching coil of relay K55 which now closes its contacts K55B. This grounds the down inhibit circuit. At this time the signal A$mz$ is also at ground potential which enables downward movement of the machine spindle assembly.

Although no selective zero position is programed in the new block of tape, the new Z dimension is necessarily programed from the select zero position established by the preceding block. As the spindle assembly moves downwardly the photodiode PD0 moves past the lighted lamp and scale counting begins. When the spindle assembly reaches the programed feed distance at which $Z=F$, the rate relays are energized and contacts K$cpb$2 close. This is the last of the series connected contacts including contacts K55B and K$mpz$2, in the unlatching coil circuits of relays K51–K54 and K56. Unlatching of the relays K51–K54 restores the normal input voltages to the lamp selector gate circuit (LC5) disabling the gate, and unlatching of relay K56 opens the lamp circuits and partially enables AND gate AG5.

When the machine spindle assembly reaches the bottom, $Z=O$, the retracting sequence takes place. Since the select zero lamp is now turned off, the spindle assembly continues in retracting movement into its upper limit at which point the limit switch LS is closed. When the contacts K$fd$M close, the output of AND gate AG5 applied to terminal J$_n$ of flip flop FQ$lz$ switches the flip flop to its "1" representing electrical state to enable the count gates CG through flip flop FQ$rz$ so that scale counting may take place from scale zero on the next cycle of downward movement.

Although but one embodiment of this invention has been illustrated and described, it will be appreciated by those skilled in the art that numerous changes may be made herein without departing from the spirit and scope of this invention. In this connection reference may be made to the various logical circuits, the flip flop circuits, signal shaper circuits, transducers and the lamp circuits, all of which are of particular specific configuration in accordance with present engineering preferences. Such circuits, it will be appreciated, may be changed in accordance with specific requirements of particular systems while maintaining the general inventive concept which has been described.

Similarly, mechanical or magnetic tape readers may be substituted for that shown. Card readers or magnetic drums also represent acceptable discrete signal program devices. Stepping switches may be substituted for the electrical distributors. Other types of amplifiers employing other components may be incorporated. Electric drives may replace hydraulic drives and other transducers may be employed in place of the photoelectric type shown to achieve the select zero function. In this latter case, a relay selected by a lamp circuit may have an enabling contact in series with a cam-operated switch on the spindle assembly, as the full equivalent of the lamp circuit.

The invention may also be practiced on axes of a machine other than the spindle axis and may be practiced advantageously on any machine other than a machine tool where positioning requirements indicate a need for movement from positions other than a fixed limit.

Accordingly, it is intended that the foregoing disclosure and the showings made in the drawings may be considered only as illustrative of the principles of this invention and not construed in a limiting sense.

What is claimed is:
1. A machine control, comprising:
a pair of relatively movable members;
servo means coupled to said members to relatively move said members;
a discrete signal program device;
incremental position transducer means coupled to and operated by said members;
count pulse producing means coupled to said position transducer means and controlled thereby;
normally inactive, zero transducer means coupled to said members at displaced points along the path of relative movement of said members;
zero transducer selector means coupled to and responsive to said program device and having an output coupled to said zero transducer means for rendering said zero transducer means active at a selected point along said path of relative movement;
control means coupled to and controlled by said zero transducer means and having an output coupled to said count pulse producing means for inhibiting count pulse production until said members occupy relative positions at said selected point;
and circuit means coupled to said program device and said count pulse producing means and responsive thereto and having an output coupled to said servo means.

2. A machine tool control, comprising:
a pair of relatively movable members;
servo means coupled to said members to relatively move said members;
a discrete signal program device;
incremental position transducer means coupled to and operated by said members;
count pulse producing means coupled to said position transducer means and controlled thereby;
zero transducers having a plurality of elements on one of said members along the path of relative movement of said members and having at least one element on the other of said members cooperating with a selected one of said plurality of elements;
circuit means coupled to and responsive to said program device and having an output coupled to said plurality of elements for selecting one of said plurality of elements for operation;

circuit means coupled to and responsive to said one element and coupled to said count pulse producing means for inhibiting count pulse production until said one element is adjacent a selected one of said plurality of elements;

and circuit means coupled to both said program device and said count pulse producing means and responsive thereto and having an output coupled to said servo means.

3. A machine control, comprising:

a pair of relatively movable members;

power means coupled to said members to relatively move said members;

power control means coupled to said power means to control said power means;

a discrete signal program device;

incremental position transducer means coupled to and operated by said members;

a position count generator coupled to and responsive to said position transducer for generating discrete count signals representative of increments of relative movement between said members;

normally inactive individual zero transducer devices coupled to said members along the path of relative movement;

selector means coupled to said program device and responsive thereto and having an output coupled to said zero transducer devices for rendering active a particular zero transducer device;

count control means coupled to and controlled by said zero transducer devices and having an output coupled to said position count generator to inhibit said discrete count signals during relative movement of said members until said active zero transducer device operates;

and circuit means coupled to both said program device and said position count generator and responsive thereto and having an output coupled to said power control means to move said power means.

4. A machine control, comprising:

a pair of relatively movable members;

servo means coupled to said members to relatively move said members;

a discrete signal program device;

incremental position transducer means coupled to and operated by said members;

a normally disabled count pulse circuit coupled to and controlled by said position transducer means;

normally inoperative, zero transducer means on said members for selecting particular points along the path of relative movement of said members at which pulse counting may take place;

selector means coupled to and controlled by said program device and coupled to said zero transducer means for rendering said zero transducer means operative at a particular point along said path of relative movement;

enabling circuit means coupled to said zero transducer means and controlled thereby and having an output coupled to said count pulse circuit for enabling said count pulse circuit;

and circuit means coupled to both said program device and said count pulse circuit and having an output coupled to and controlling said servo means.

5. A control for a servo having a pair of relatively movable output members, comprising:

a discrete signal program device;

incremental position transducer means adapted to be coupled to said members and producing discrete signals indicative of increments of relative movement of said members;

a normally disabled count signal circuit coupled to and controlled by said position transducer means for producing count signals when enabled, indicative of said increments of relative movement;

normally inoperative position indicating devices adapted to be coupled to said members and selectively rendered operative to indicate particular relative positions of said members;

selector means coupled to and responsive to said program device and having an output coupled to said position indicating devices for rendering a selected position indicating device operative;

enabling circuit means coupled to said position indicating devices and responsive to the operative one of said devices, and having an output coupled to said count signal circuit for enabling said count signal circuit when said members are in the relative position indicated by said selected position indicating device;

and circuit means coupled to said program device and said count signal circuit and haivng an output adapted to be coupled to said servo for controlling said servo.

6. An electrical control system, comprising:

motor means having a pair of relatively movable output members;

a discrete signal program device;

incremental position transducer means coupled to said relatively movable members and producing discrete signals indicative of increments of relative movement of said members;

a normally disabled count signal circuit coupled to and controlled by said position transducer means for producing count signals, when enabled, indicative of increments of relative movement of said members;

normally inoperative zero transducers on said members respectively defining different relative positions of said members;

selector means coupled to and responsive to said program device and having an output coupled to said zero transducers for selecting a particular one of said zero transducers and rendering operative said selected zero transducer;

enabling circuit means coupled to and responsive to the operative one of said zero transducers when said members are relatively positioned in accordance with said operative zero transducer and having an output coupled to said count signal circuit to enable said count signal circuit;

and counter means having at least one set input circuit coupled to said program device and a countdown input circuit coupled to said count signal circuit and controlled thereby, and having an output coupled to said motor means to control said motor means.

7. A machine control, comprising:

a pair of relatively movable members;

servo means coupled to said members to relatively move said members;

a discrete signal program device;

incremental position transducer means coupled to and operated by said members;

a normally disabled count pulse circuit coupled to and controlled by said position transducer means;

normally inoperative, zero transducer means on said members for selecting particular points along the path of relative movement of said members at which pulse counting may take place;

selector means coupled to and controlled by said program device and coupled to said zero transducer means for rendering said zero transducer means operative at a particular point along said path of relative movement;

enabling circuit means coupled to said zero transducer means and controlled thereby when said zero transducer means is operative, and having an output coupled to said count pulse circuit for enabling said count pulse circuit;

second enabling circuit means including a limit transducer coupled to and operated by said members in a limit of relative movement, and having an output coupled to said count pulse circuit;

means coupled to and controlled by said selector means, in the absence of control of said selector means by said program device, to render operative said zero transducer means, and coupled to said second enabling circuit means for rendering operative said second enabling circuit means;

and circuit means coupled to both said program device and said count pulse circuit and having an output coupled to and controlling said servo means.

8. An electrical control system, comprising:

motor means having a pair of relatively movable output members;

a discrete signal program device;

incremental position transducer means coupled to said relatively movable members and producing discrete signals indicative of increments of relative movement of said members;

a normally disabled count signal circuit coupled to and controlled by said position transducer means for producing count signals, when enabled, indicative of increments of relative movement of said members;

normally inoperative zero transducers on said members respectively defining different relative positions of said members;

selector means coupled to and responsive to said program device and having an output coupled to said zero transducers for selecting a particular one of said zero transducers and rendering operative said selected zero transducer;

enabling circuit means coupled to and responsive to the operative one of said zero transducers when said members are relatively positioned in accordance with said operative zero transducer and having an output coupled to said count signal circuit to enable said count signal circuit;

second enabling circuit means including a limit transducer coupled to and operated by said members in a limit of relative movement, and having an output coupled to said count signal circuit;

means coupled to and controlled by said selector means in the absence of selection of one of said zero transducers, for rendering operative said second enabling circuit;

and counter means having at least one set input circuit coupled to said program device and a countdown input circuit coupled to said count signal circuit and controlled thereby, and having an output coupled to said motor means to control said motor means.

9. An electrical control system, comprising:

motor means having a pair of relatively movable output members;

a discrete signal program device;

incremental position transducer means coupled to said relatively movable members and producing discrete signals indicative of relative movement of said members;

a normally disabled count signal circuit coupled to said position transducer means and, when enabled, producing count signals indicative of increments of relative movement of said members;

a fixed zero position transducer coupled to and controlled by said members;

zero position control circuit means coupled to and operated by said program device for selecting a zero position other than said fixed zero position;

enabling circuit means coupling said fixed zero position transducer means and said zero position control circuit means to said count signal circuit;

circuit means coupled to and controlled by said zero position control circuit means when operated by said program device for inhibiting enabling of said count signal circuit by said fixed zero position transducer;

and circuit means coupled to said program device and to said count signal circuit and controlled thereby and having an output coupled to said motor means to control said motor means.

10. An electrical control system, comprising:

motor means having a pair of relatively movable output members;

a discrete signal program device;

incremental position transducer means coupled to and controlled by said members;

a normally disabled count signal circuit coupled to said position transducer means and, when enabled, producing count signals indicative of increments of relative movement of said members;

respective zero position transducers coupled to said relatively movable members at displaced points along the path of relative movement of said members;

circuit means coupled to and controlled by said program device and coupled to said zero position transducers and said count signal circuit for enabling said count signal circuit in response to one of said zero position transducers;

and motor control circuit means coupled to said program device and to said count signal circuit and controlled thereby and having an output coupled to said motor means for controlling said motor means.

References Cited by the Examiner

UNITED STATES PATENTS

| | | |
|---|---|---|
| 2,785,353 | 3/57 | Fenemore. |
| 2,886,753 | 5/59 | Abbott. |
| 2,905,874 | 9/59 | Kelling. |
| 3,068,386 | 12/62 | Jaeger et al. |
| 3,086,151 | 4/63 | Herzl. |
| 3,117,263 | 1/64 | MacDonald. |

JOHN F. COUCH, *Primary Examiner.*